(12) United States Patent
Fenton

(10) Patent No.: US 7,144,031 B2
(45) Date of Patent: Dec. 5, 2006

(54) SUSPENSION ISOLATOR EQUALIZER

(75) Inventor: E. Dale Fenton, Columbia, MO (US)

(73) Assignee: Advanced Designed Systems Inc., Columbia, MO (US)

( * ) Notice: Subject to any disclaimer, the term of this patent is extended or adjusted under 35 U.S.C. 154(b) by 51 days.

(21) Appl. No.: 10/694,259

(22) Filed: Oct. 27, 2003

(65) Prior Publication Data
US 2004/0119260 A1 Jun. 24, 2004

Related U.S. Application Data

(60) Provisional application No. 60/421,234, filed on Oct. 25, 2002.

(51) Int. Cl.
B60G 5/00 (2006.01)

(52) U.S. Cl. ............... 280/682; 280/686; 280/124.174; 267/46

(58) Field of Classification Search ......... 280/124.163, 280/124.165, 124.174, 124.175, 682, 686, 280/680, 681, 678, 683; 267/46, 52, 271, 267/266, 269, 260, 31, 47
See application file for complete search history.

(56) References Cited

U.S. PATENT DOCUMENTS

| | | | | |
|---|---|---|---|---|
| 2,170,454 A | * | 8/1939 | Larison ................. | 280/81.1 |
| 2,719,728 A | * | 10/1955 | Boyles .................. | 280/682 |
| 2,811,213 A | * | 10/1957 | Miller ................... | 180/24.12 |
| 3,003,781 A | * | 10/1961 | Black .................... | 280/683 |
| 3,856,325 A | * | 12/1974 | Willetts ................ | 280/687 |
| 4,033,606 A | * | 7/1977 | Ward et al. .......... | 280/682 |
| 4,504,079 A | * | 3/1985 | Strong .................. | 280/683 |
| 4,570,971 A | * | 2/1986 | Perlini ................. | 280/680 |
| 4,676,523 A | * | 6/1987 | Rogers ................. | 280/682 |
| 5,697,172 A | | 12/1997 | Verseef | |
| 5,951,032 A | | 9/1999 | Overby et al. | |
| 6,015,158 A | | 1/2000 | Overby | |
| 6,092,819 A | | 7/2000 | Overby et al. | |
| 6,220,585 B1 | | 4/2001 | Heron | |
| 6,478,321 B1 | * | 11/2002 | Heitzmann .......... | 280/124.177 |

OTHER PUBLICATIONS

Two pages of truckspring.com website detailing Timbren Ride Control products dated Jun. 3, 2002.
Printout of MOR/ryde Rubber Equalizer Suspension System Installation Instructions; Six (6) pages.
Printout of Dexter Axle's Hagner and Ataching Parts Kits; Two (2) pages.
Printout from www.al-kousa.com website detailing leaf spring axles; One (1) page.
Printout of the Hutch 9700 Trailer Suspension Series; Four (4) pages.
Printout of the Holland Group's Mechanical Suspension Series; Two (2) pages.
Printout from www.transport.tuthull.com website detailing Four Spring Van Slider Sluspension; One (1) page.

* cited by examiner

Primary Examiner—David R. Dunn
(74) Attorney, Agent, or Firm—Trexler, Bushnell, Giangiorgi, Blackstone & Marr, Ltd

(57) ABSTRACT

An isolator for use in a suspension system includes a front shaft and a rear shaft. A front spring arm and a front transitional arm are mounted to the front shaft. A rear spring arm and a rear transitional arm are mounted to the rear shaft. A resilient member is mounted between the front and rear transitional arms. As forces are applied to the front and rear link arms, the front and rear shafts rotate causing the front and rear transitional arms to rotate. As the front and rear transitional arms rotate, the resilient member is compressed and expanded accordingly.

26 Claims, 19 Drawing Sheets

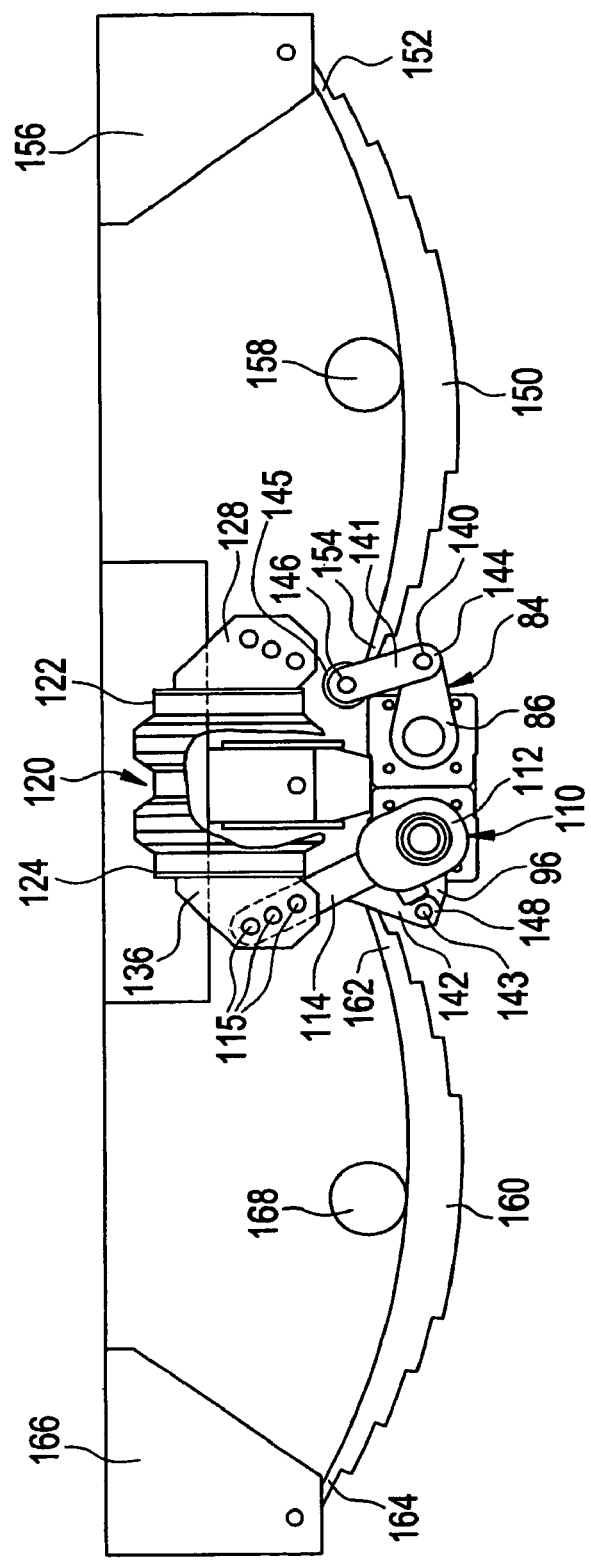

US 7,144,031 B2

SUSPENSION ISOLATOR EQUALIZER

RELATED APPLICATION (PRIORITY CLAIM)

This application claims the benefit of U.S. Provisional Application Ser. No. 60/421,234, filed Oct. 25, 2002.

BACKGROUND OF THE INVENTION

This invention is generally directed to a suspension system for a vehicle, such as, a trailer or a tractor.

A prior art suspension system currently used on trailers incorporates an equalizing toggle rocker such as the one shown in FIG. 1. The suspension system 2 is mounted on the left side of the trailer and includes a forward leaf spring 4, a rear leaf spring 6, an equalizing toggle rocker 8, a forward shackle 10 and a rear shackle 12. A front end 4a of the forward leaf spring 4 is attached to the frame 14 of the trailer at a point A. The standard equalizing toggle rocker 8 is generally triangular in shape, having a first point 8a, a second point 8b and a third point 8a. The first point 8a of the toggle rocker 8 is attached to a center frame hanger 15 which depends from the frame 14 of the trailer. The first point 8a of the toggle rocker 8 is attached to the center frame hanger 15 at a point B. A first end 10a of the forward-shackle 10 is pivotally mounted to the second point 8b of the toggle rocker 8. The first end 12a of the rear shackle 12 is pivotally mounted to the third point 8c of the toggle rocker 8. A second end 10b of the front shackle 10 is pivotally mounted to the rear end 4b of the front leaf spring 4. A second end 12b of the rear shackle 12 is pivotally mounted to the front end 6a of rear leaf spring 6. A second end 6b of the rear leaf spring 6 is attached to the frame 14 of the trailer at a point C. A front axle 16 is positioned on front spring 4 and a rear axle 17 is positioned on rear spring 6. An identical suspension system is provided on the right side of the trailer.

To the extent possible, road shock and vibrations from the tires are absorbed by the front and rear leaf springs 4, 6. Points A, B, and C are the contact points through which the road shock is passed to the frame rails 14. The fixed equalizing toggle rocker 8 induces cross forces. For example, an upward motion of the front leaf spring 4 results in a downward motion of rear leaf spring 6.

To eliminate cross forces, independent suspension systems are sometimes used on trailers. In these independent suspension systems, springs are mounted in a vertical orientation proximate each wheel. In a tandem axle suspension system, therefore, four springs are used and in a tri-axle system six springs are used. These systems attempt to absorb the road shock and vibrations experienced by each wheel by dampening the shock an vibrations with the springs. Often, however, much of the road shock and vibrations are translated to the frame of the trailer.

OBJECTS AND SUMMARY OF THE INVENTION

A general object of the present invention is to provide a suspension system which absorbs road shock and vibration experienced by the axles of a vehicle, such as a trailer or tractor.

Another object of an embodiment of the present invention is to provide a suspension system which removes the interactive forces between two leaf springs.

Yet another object of an embodiment of the present invention is to provide a suspension system in which road shock and vibration experienced by the axles of a vehicle are isolated from the frame of the vehicle.

A further object of an embodiment of the present invention is to provide a suspension system in which road shock and vibration experienced by one axle of a vehicle are isolated from another axle of the vehicle.

Yet a further object of an embodiment of the present invention is to provide a suspension system through which the ride height of the vehicle can be easily adjusted.

Still a further object of an embodiment of the present invention is to provide a suspension system which can be cost efficiently manufactured and installed.

Briefly and in accordance with the foregoing, the present invention discloses a suspension system in which the front and rear leaf springs are indirectly connected to front and rear cross shaft which rotate in response to road shocks and vibrations. Rotation of the front and rear cross shafts results in the application of force on a spring which dampens the forces and isolates the forces from the frame of the vehicle.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which:

FIG. 8 is a right side view of a portion of a suspension system including the suspension isolator of FIG. 2, wherein portions of the suspension isolator have been removed for clarification;

DETAILED DESCRIPTION OF THE ILLUSTRATED EMBODIMENT

Figure 1:
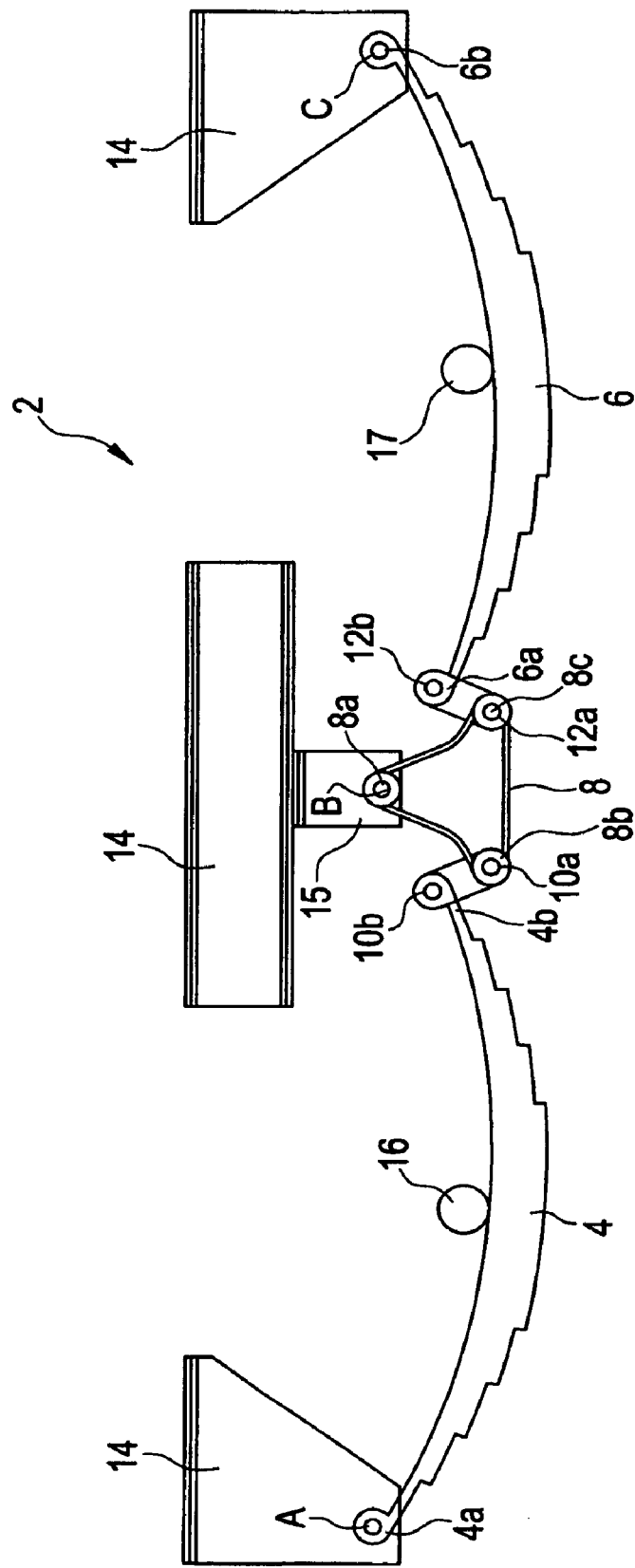
FIG. 1 is a right side view of a portion of a prior art suspension system.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 19:
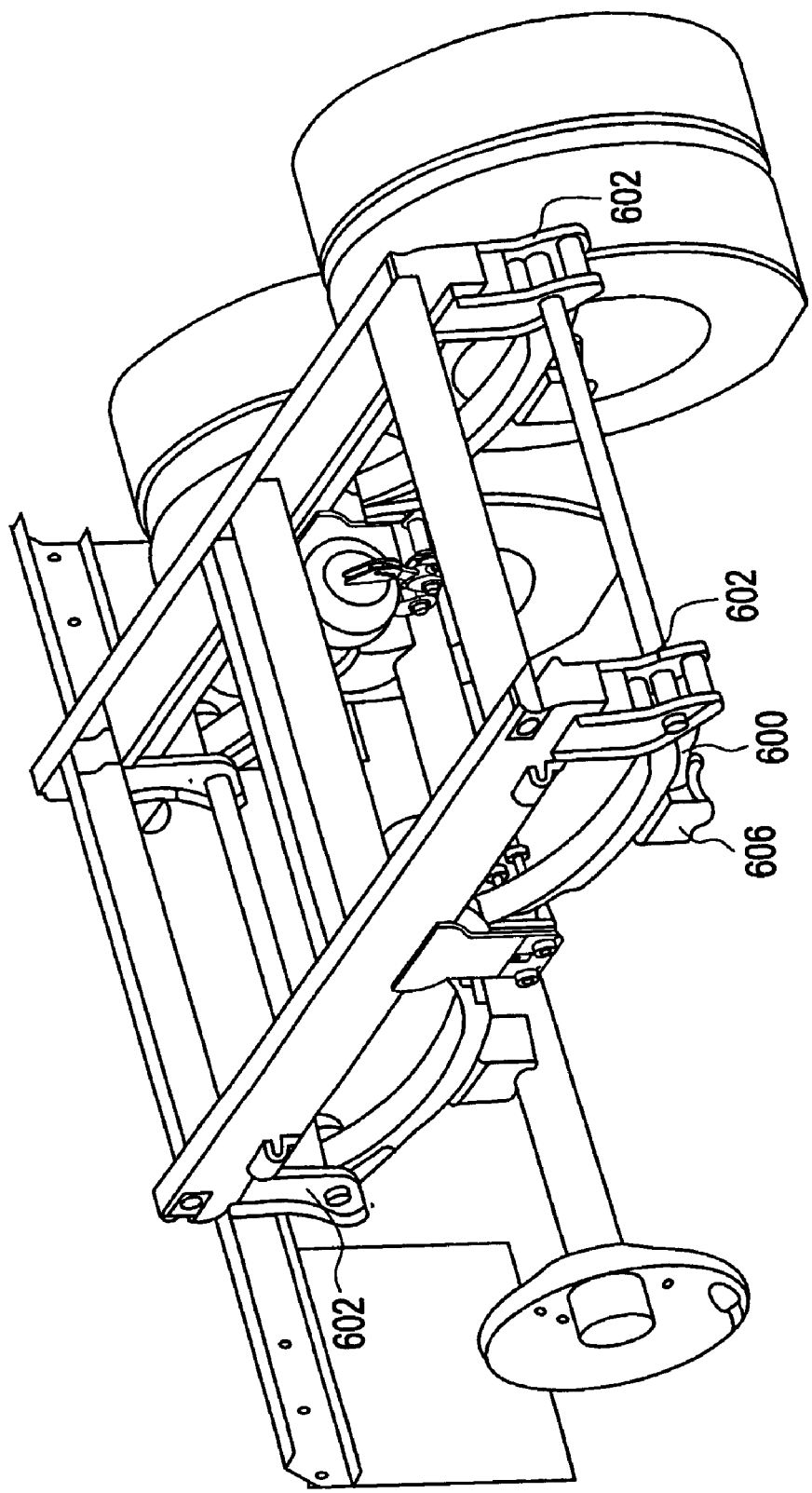
FIG. 19 is a perspective view of a portion of a suspension system in which the suspension isolator of the present invention can be used.
Figure 20:
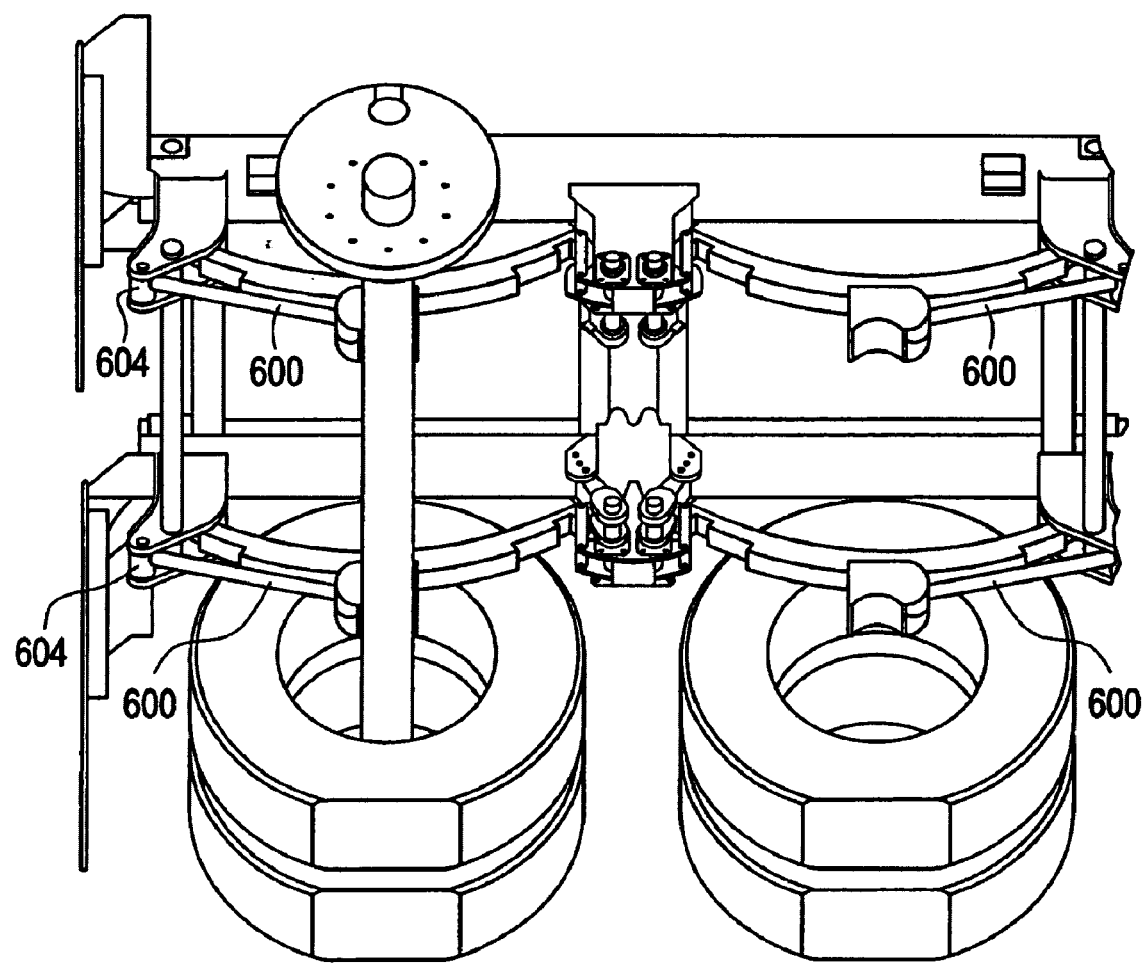
FIG. 20 is another perspective view of a portion of the suspension system of FIG. 19.

A first embodiment of the present invention is shown in FIGS. 2–10. A second embodiment of the invention is shown in FIGS. 11–14. A third embodiment of the invention is shown in FIGS. 15–18. Each of the systems shown can be used in connection with vehicles having tandem or multiple-axle systems. FIGS. 19–20 show use of the present invention in connection with a vehicle having tandem drive axles.

Figure 2:
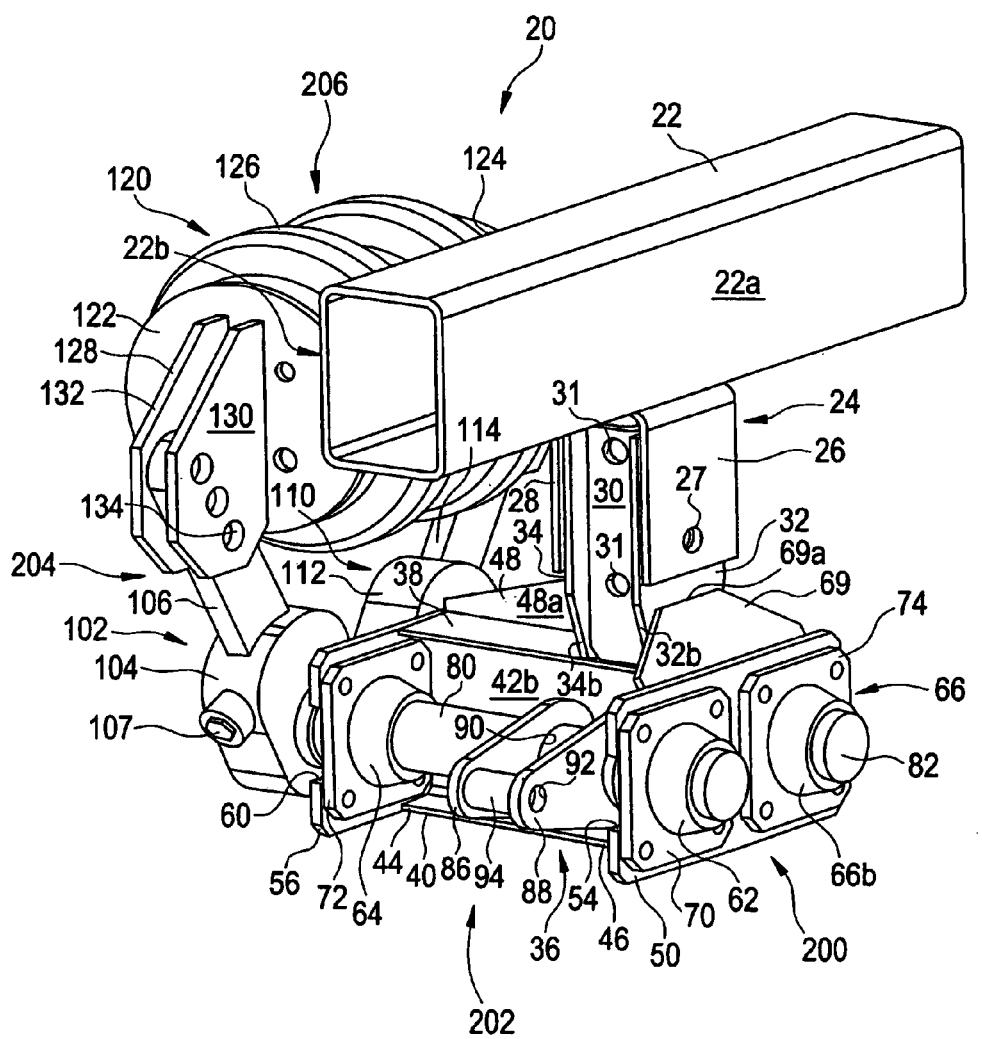
FIG. 2 is a perspective view of a first embodiment of a suspension isolator which incorporates the features of the present invention, the suspension isolator form a portion of a suspension system.

Attention is invited to the first embodiment shown in FIGS. 2–10. As shown in FIG. 2, a suspension system 20 in accordance with the present invention is attached to the frame 22 (a portion of which is shown) of a vehicle, such as a trailer or a tractor. It is to be understood that the suspension system 20 includes identical left and right sides to be used on the left and right sides of the vehicle, however only one side of the suspension system 20 is shown in the drawings and described herein. The suspension system 20 is used to absorb shocks and vibrations encountered by the wheels of the vehicle.

The frame 22 generally extends along the length of the vehicle. The frame 22 includes an outer surface 22a and an inner surface 22b. For purposes of this description, directions are defined in the following manner: forward/front refers to the direction toward the front of the vehicle, rearward/rear refers to the direction toward the back of the vehicle, inward/inner refers to the direction toward the center of the vehicle, outward/outer refers to the direction toward the outer perimeter of the vehicle, upward/upper/top refers to the direction toward the top of the vehicle and downward/lower/bottom refers to the direction toward the surface upon which the vehicle rests.

A generally U-shaped frame bracket 24 is attached to the bottom surface of the frame 22. The frame 22 is preferably metal. The frame bracket 24 includes a base portion 25, see FIG. 3, a first leg 26 and a second leg 28. The base portion 25 abuts the lower surface of the frame 22 and is attached thereto by suitable means such as welding. The first leg 26 of the frame bracket 24 extends downward from the frame 22 and is proximate the outer edge of the vehicle on which the suspension system 20 is mounted. An aperture 27, see FIG. 2, is provided through the first leg 26. The second leg 28 of the frame bracket 24 extends downward from the frame 22 and is generally parallel to the first leg 26. An aperture 29 is provided through the second leg 28, see FIG. 4.

Two bracket spacers 30, only one of which is shown, are spaced apart and are positioned between the first leg 26 and the second leg 28 of the frame bracket 24. The bracket spacers 30 are preferably metal. The bracket spacers 30 are generally rectangular in shape and are positioned perpendicular to the first and second legs 26, 28. Two apertures 31 are provided through each bracket spacer 30.

A first bracket attachment 32 is positioned between the first leg 26 of the frame bracket 24 and the bracket spacers 30. The first bracket attachment 32 is preferably metal. The first bracket attachment 32 is elongated and includes a first end 32a and a second end 32b which is tapered. The first end 32a of the bracket attachment 32 is positioned proximate the base portion 25 of the bracket 24. The second end 32b of the bracket attachment 32 extends downwardly beyond the first leg 26 of the frame bracket 24. An aperture is provided in the first bracket attachment 32 and is aligned with the aperture 27 through the first leg 26 of the frame bracket 24.

A second bracket attachment 34 is positioned between the second leg 28 of the frame bracket 24 and the bracket spacers 30. The second bracket attachment 34 is preferably metal. The second bracket attachment 34 is elongated and includes a first end 34a and a second end 34b which is tapered. The first end 34a of the bracket attachment 34 is positioned proximate the base portion 25 of the bracket 24. The second end 34b of the bracket attachment 34 extends downwardly beyond the second leg 28 of the frame bracket 24. An aperture is provided through the second bracket attachment 34 and is aligned with the aperture 29 through the second leg 28 of the frame bracket 24. The isolator 20 is mounted to the frame 22 of the vehicle by passing a bolt through the aperture 27 of the first leg 26 of the frame bracket 24, through aperture of the first bracket attachment 32, through the aperture of the second bracket attachment 34, and through the aperture 29 of the second leg 28 of the frame bracket 24. Alternatively, the isolator 20 can be mounted by welding the isolator 20 to the frame bracket 24.

An I-beam 36 is positioned proximate the second ends 32b, 34b of the bracket attachments 32, 34, and is preferably metal. The I-beam 36 includes an upper horizontal member 38 and a lower horizontal member 40 which is parallel to the upper horizontal member 38. A vertical member 42 attaches the upper horizontal member 38 to the lower horizontal member 40. The vertical member 42 has a front side (not shown) and a rear side 42b. The I-beam 36 includes an inner end 44 and an outer end 46. The top surface of the upper horizontal member 38 abuts the second ends 34b, 36b of the first and second bracket attachments 34, 36 and is attached thereto, proximate the outer end 46 of the I-beam 36, by suitable means such as welding. Although the isolator has been described as including an I-beam 36, it is to be understood that the isolator 20 could include a variety of structures for supporting elements of the isolator. Such structures could include, for example, an elongated triangularly-shaped element.

A base brace 48 is mounted to the top surface of the upper horizontal member 38 of the I-beam 36. The base brace 48 is preferably metal and is generally triangularly shaped. A lower edge 48a of the base brace 48 is fixed to the top surface of the upper horizontal member 38 by suitable means such as welding, and extends from the second bracket attachment 34 to the inner end 44 of the I-beam 36. An outer edge 48b of the base brace 48 is fixed to the inner surface of the second bracket attachment 34 by suitable means such as welding.

An outer bearing bracket 50 is mounted on the outer end 46 of the I-beam 36, perpendicular to the I-beam 36 and parallel to the frame 22. The outer bearing bracket 50 is generally rectangular and includes a forward C-shaped opening 52, see FIG. 5, and a rearward C-shaped opening 54

Figure 5:
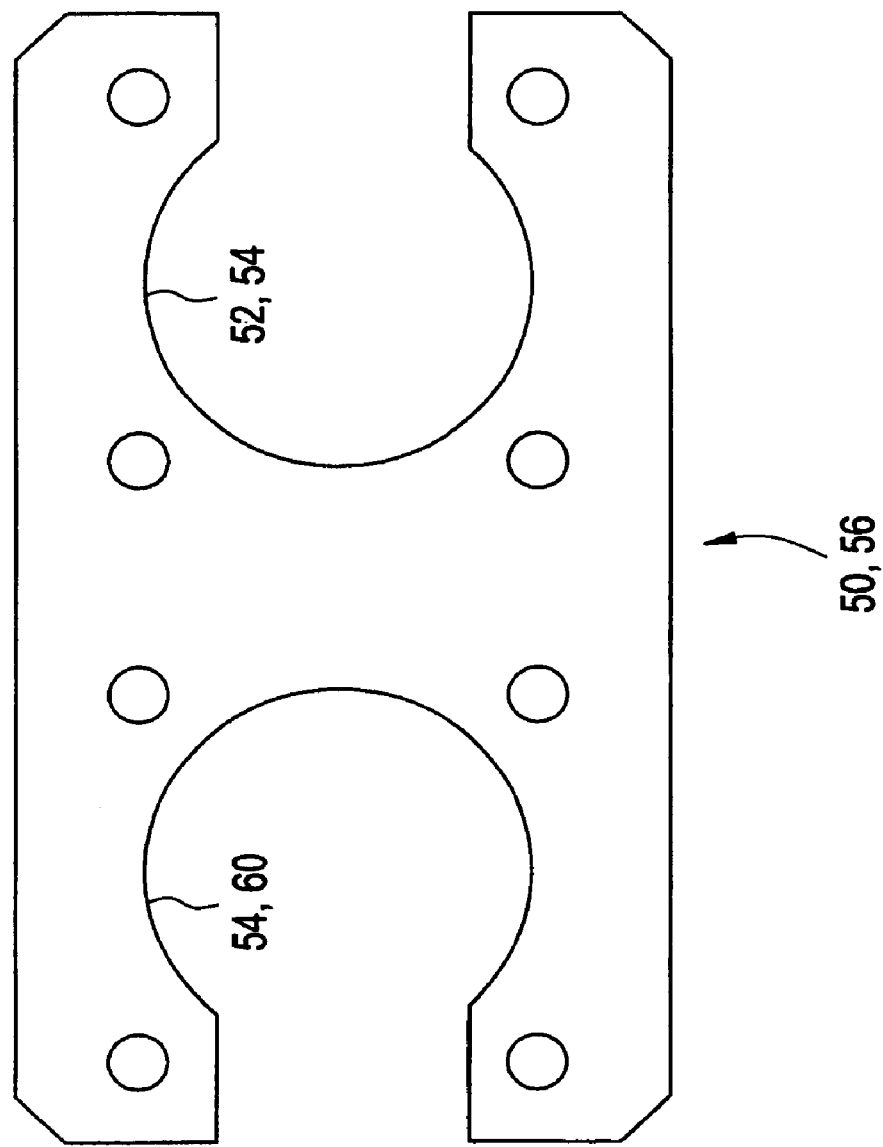
FIG. 5 is an elevational view of a bearing bracket of the suspension isolator of FIG. 2.

(see FIG. 5). An inner bearing bracket 56 is mounted on the inner end 44 of the I-beam 36, perpendicular to the I-beam 36 and parallel to the frame 22. The inner bearing bracket 56 is generally rectangular and includes a forward C-shaped opening 59 and a rearward C-shaped opening 60. The outer bearing bracket 50 and the inner bearing bracket 56 are preferably formed from metal.

Each of the C-shaped openings 52, 54, 59, 60 supports a tapered bearing 62, 64, 66, 68. A rear outer bearing 62 is supported within opening 54, a rear inner bearing 64 is supported within opening 60, a front outer bearing 66 is supported within opening 52, and a front inner bearing 68 (see FIG. 4) is supported the front C-shaped opening 59.

Figure 3:
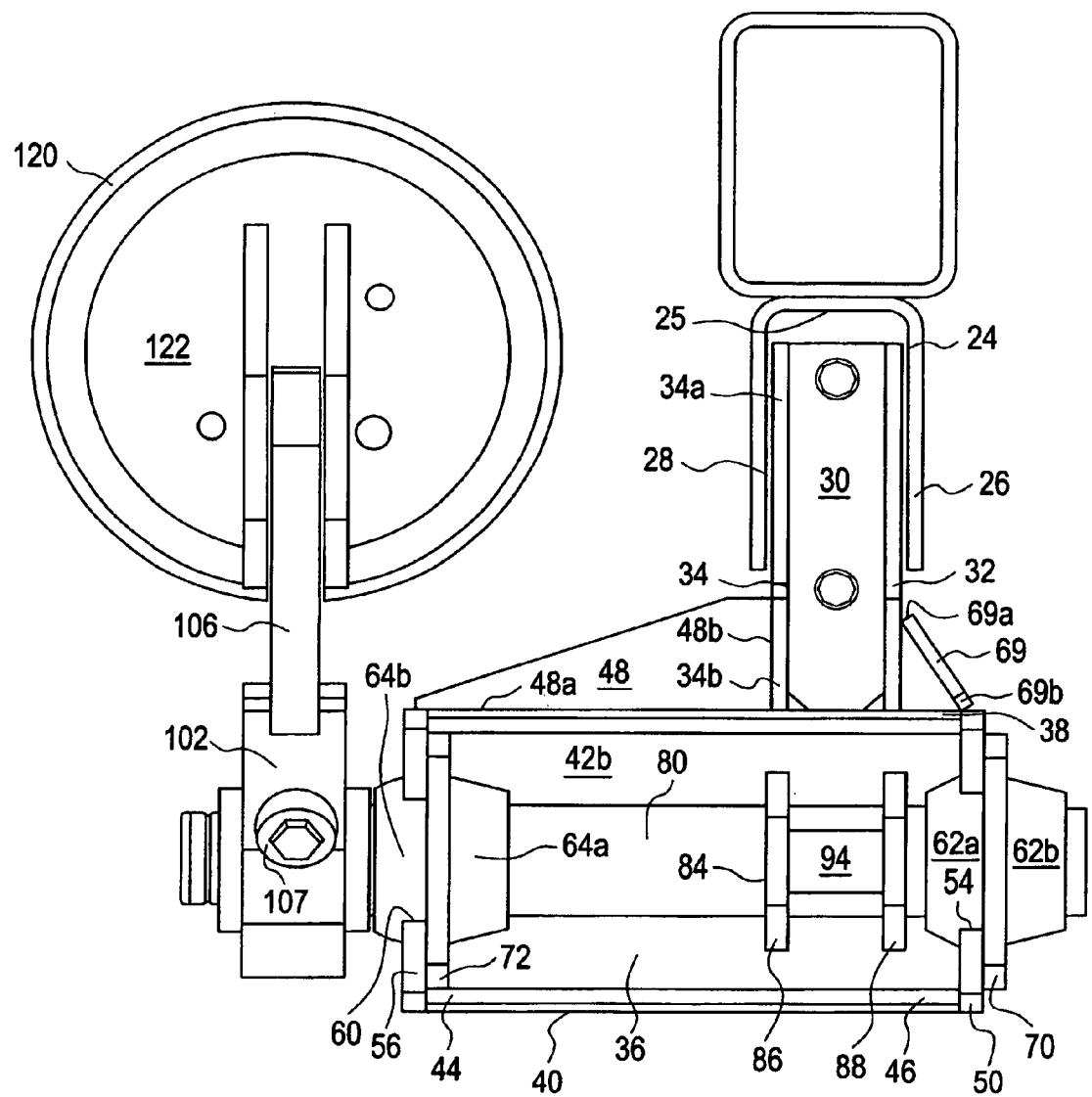
FIG. 3 is a rear view of the suspension isolator of FIG. 2.
Figure 4:
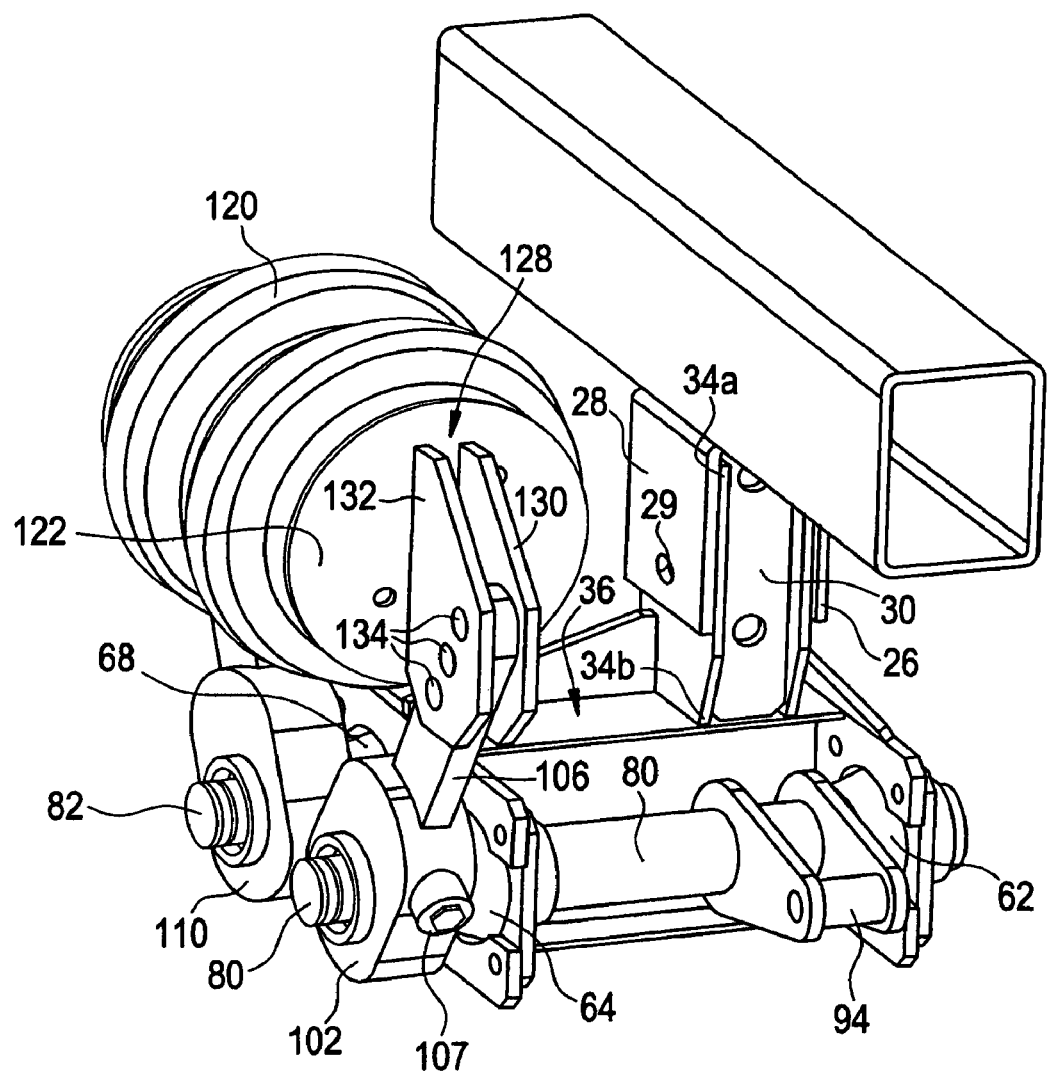
FIG. 4 is a perspective view of the suspension isolator of FIG. 2.

Each bearing 62, 64, 66, 68 is identically formed. As shown in FIG. 3, rear outer bearing 62 includes a first portion 62a and a second portion 62b. Rear inner bearing 64 includes a first portion 64a and a second portion 64b. Front outer bearing 66 and front inner bearing 68 also include first and second portions.

A bearing brace 69 is positioned near the outer end 46 of the I-beam 30. The bearing brace 69 includes a top 69a and a bottom 69b and is preferably metal. The width of the bearing brace 69 is smaller proximate to the top 69a than proximate to the bottom 69b. The top 69a of the bearing brace 69 abuts the outer surface of the first bracket attachment 32 and is attached thereto by suitable means such as welding. The bottom 69b abuts the outer bearing bracket 50 and is attached thereto by suitable means such as welding.

A rear outer bearing plate 70, which is generally square in shape, is mounted to the outer surface of the outer bearing bracket 50 and has a circular aperture therethrough (not shown). The rear outer bearing plate 70 is preferably metal. The first portion 62a of rear outer bearing 62 is supported within the C-shaped opening 54 of outer bearing bracket 50 and abuts the inner surface of the rear outer bearing plate 70.

The second portion 62b of rear outer bearing 62 abuts the outer surface of rear outer bearing plate 70.

A rear inner bearing plate 72, which is generally square in shape, is mounted on the outer surface of the inner bearing bracket 56 and has a circular aperture therethrough (not shown). The rear inner bearing plate 72 is preferably metal. The first portion 64a of the rear inner bearing 64 abuts the outer surface of the rear inner bearing plate 72. The second portion 64b of rear inner bearing 64 rests within the C-shaped opening 60 of inner bearing bracket 56 and abuts the inner surface of rear inner bearing plate 72.

A front outer bearing plate 74 is shaped and mounted in a manner similar to the rear outer bearing plate 70. The front outer bearing plate 74 is preferably metal and is mounted to the outer surface of the outer bearing bracket 50. The first portion of the front outer bearing 66 is supported within the C-shaped opening 52 of the of the outer bearing bracket 50 and abuts the inner surface of the front outer bearing plate 74. The second portion of the front outer bearing 66 abuts the outer surface of front outer bearing plate 74.

A front inner bearing plate (not shown) is shaped and mounted in a manner similar to the rear inner bearing plate 72. The front inner bearing plate is preferably metal and is mounted on the outer surface of the inner bearing bracket 56. The first portion of the front inner bearing 68 abuts the outer surface of the front inner bearing plate. The second portion of the front inner bearing 68 rests within the forward C-shaped opening of the inner bearing bracket 56 and abuts the inner surface of the front inner bearing plate.

Figure 6:
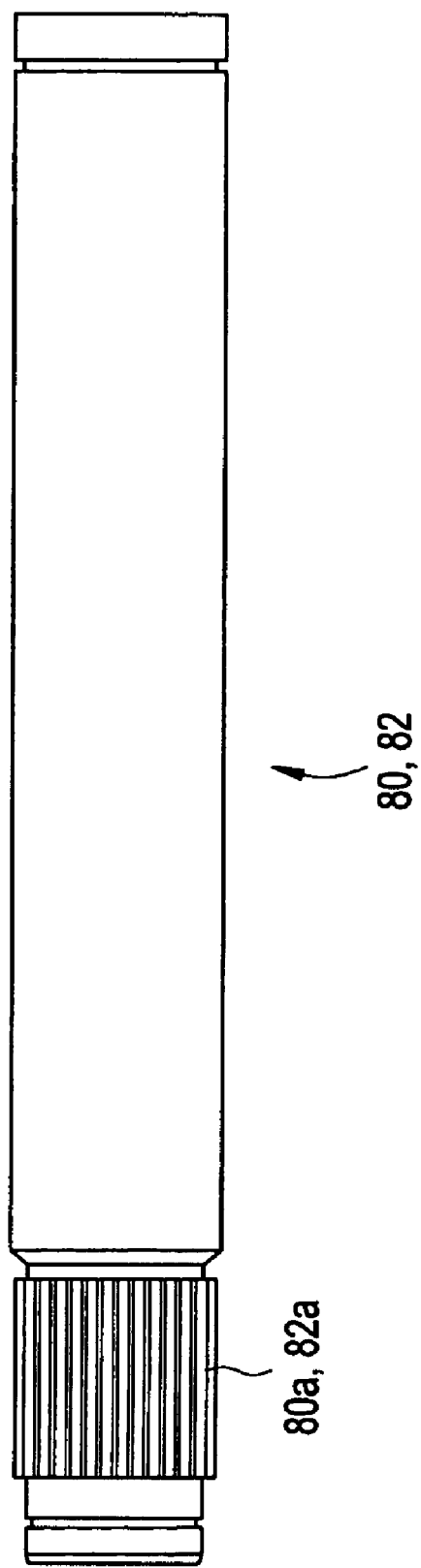
FIG. 6 is an elevational view of a shaft of the suspension isolator of FIG. 2.

An elongated rear cross shaft 80 extends between the rear outer bearing 62 and the rear inner bearing 64. The rear cross shaft 80 is preferably metal. The rear cross shaft 80 also extends through the rear outer bearing 62 and rear inner bearing 64, such that, inner end of the rear cross shaft 80 extends beyond inner bearing bracket 56 and beyond the second portion 64b of rear inner bearing 64. As shown in FIG. 6, a portion 80a of the rear cross shaft 80, proximate the inner end, is splined.

A front cross shaft 82 extends between front outer bearing 66 and front inner bearing 68. The front cross shaft 82 is preferably metal. The front cross shaft 82 also extends through front outer bearing 66 and front inner bearing 68, such that, the inner end of front cross shaft 82 extends beyond the inner bearing bracket 56 and the second portion of front inner bearing 68. As shown in FIG. 6, a portion of the front cross shaft 82, proximate the inner end, is splined.

A rear link arm 84 is mounted to the rear cross shaft 80. The rear link arm 84 includes an inner plate 86 and an outer plate 88 which are spaced apart from one another. The inner and outer plates 86, 88 are generally triangular, and each plate 86, 88 includes a shaft opening 90 and a link eye opening 92. The rear cross shaft 80 passes through the shaft openings 90 and is fixed to the plates 86, 88 by suitable means such as welding. A shaft 94 is positioned between the inner and outer plates 86, 88 such that the link eye openings 92 are in communication with a passageway through the shaft 94.

A front link arm 96 is mounted to the front cross shaft 82. The front link arm 96 is identical to the rear link arm 84 and includes an inner plate, an outer plate and a shaft positioned between the inner and outer plates. The rear cross shaft 82 passes through the shaft openings of the front link arm 96 and is fixed to the inner and outer plates by suitable means such as welding. The shaft is attached to the inner and outer plates of the front link arm 96 such that the link eye openings are in communication with a passageway through the shaft.

A rear transitional arm 102 is mounted on the splined portion 80a of the rear cross shaft 80. The rear transitional arm 102 is provided in the form of a slack adjuster, such as, for example, a standard brake slack adjuster found on air brake trailer axles. The rear slack adjuster 102 includes an oblong body 104 and a generally upwardly extending arm 106. An aperture 108 is provided in the body 104 for receiving the splined portion 80a of the rear cross shaft 80. The aperture 108 includes a spline which mates with the splined portion 80a of the rear cross shaft 80. An adjusting screw 107 is provided within the body 104 of the rear slack adjuster 102. The adjusting screw 107 is used to set the ride height level as will be described herein. The arm 106 of the slack adjuster includes three apertures which are used for installation as will be described herein.

A front transitional arm 110 is identical to the rear transitional arm 102. The front transitional arm is provided in the form of a slack adjuster. The front slack adjuster 110 is mounted on the splined portion 82a of the front cross shaft 82. The front slack adjuster 110 includes a body 112 and a generally upwardly extending arm 114. An aperture is provided in the body 112 for receiving the splined portion 82a of the front cross shaft 82. The aperture includes a spline which mates with the splined portion 82a of the front cross shaft 82. The arm 114 of the slack adjuster 110 includes three apertures 115 (see FIG. 8) which are used for installation as will be described herein.

A generally cylindrical air bag 120 and is provided between the arm 106 of the rear slack adjuster 102 and the arm 114 of the front slack adjuster 110. A circular shaped rear plate 122 is attached to the rear end of the air spring 120 and a circular shaped front plate 124 is attached to the front end of the air spring 120. The rear plate 122 and the front plate 124 are preferably metal. An aperture is provided through the rear plate 122 for supplying air to the air bag. A generally tubular-shaped center portion 126 of the air bag 120 extends from the rear plate 122 to the front plate 124. The center portion 126 of the air bag 120 is capable of collapsing and expanding as pressure is applied and released at the rear and front plates 122, 124 of the air spring 120. Although the system is described using an air bag 120, alternatively a steel spring, a coil spring, a rubber spring or other composite material could be used for dampening. For example, a rubber shock mass, such as the rubber shock mass sold by Timbren® Company or a rubber spring sold by Firestone® under the trademark Marsh Mello® could be used in place of the air bag 120. However, additional advantages are provided when an air spring is used as will be described below.

A rear air bag attachment bracket 128 is mounted to the rear plate 122. The rear air bag attachment bracket 128 is preferably metal and includes an outer plate 130 and an inner plate 132. The outer plate 130 and the inner plate 132 extend from the rear plate 122 and are spaced apart a distance approximately equal to the width of the arm 106 of the rear slack adjuster 102. Apertures 134 are provided through the outer plate 130 and the inner plate 132 of the bracket 128. The apertures 134 in the outer plate 130 are aligned with the apertures in the inner plate 132 of the attachment bracket 128 to form pairs of holes.

The rear air bag attachment bracket 128 receives the arm 106 of the rear slack adjuster 102. The arm 106 of the rear slack adjuster 102 is fixed to the bracket 128 by, for example, using bolts mounted through the apertures 134 of the attachment bracket 128 and apertures in the arm 106 of the rear slack adjuster 102.

As shown in FIG. 8, a front air bag attachment bracket 136 is mounted to the front plate 124. The front air bag attachment bracket 136 is identical to the rear air bag attachment bracket 128. The front air bag attachment bracket includes an outer plate and an inner plate. The outer plate and the inner plate extend from the front plate 124 and are spaced apart a distance approximately equal to the width of the arm 114 of the front slack adjuster 110. Apertures are provided through the outer plate and the inner plate of the bracket. The holes in the outer plate are aligned with the holes in the inner plate of the attachment bracket 136 to form pairs of holes.

The front air bag attachment center bracket 136 receives arm 114 of the front slack adjuster 110. The arm 114 of the front slack adjuster 110 is fixed to the front air bag attachment bracket 136 by, for example, using bolts mounted through apertures in the front air bag attachment bracket 136 and the apertures 115 through the arm 114 of the front slack adjuster 110.

As shown in FIG. 8, the suspension system 20 includes a rear spring shackle 140 and front a spring shackle 142. The rear spring shackle 140 includes identical inner and outer plates 141 (see FIGS. 7 and 7a) and a shackle spacer 145. The inner plate 141 of the rear spring shackle 140 is spaced from the outer plate 141 of the rear spring shackle 140 by the shackle spacer 145. Each plate of the rear spring shackle 140 has a first end 144 and a second end 146. A first shackle aperture 147 is provided proximate the first end 144 and a second shackle aperture 149 is provided proximate the second end 146. The inner surface of the outer plate 141 of the rear spring shackle 140 abuts the outer surface of the outer plate 88 of the rear link arm 84. The outer surface of the inner plate 141 of rear spring shackle 140 abuts the inner surface of the inner plate 86 of the rear link arm 84. The first ends 144 of the plates 141 of the rear spring shackle 140 are pivotally attached to the rear link arm 84, by passing a shoulder bolt 143 through the first shackle aperture 147 of the inner plate 141, through the passageway of the shaft 94, and through the aperture 147 of the outer plate 141. A locking nut is provided on the shoulder bolt 143 to secure the shackle 140 to the rear link arm 84. The shackle spacer 145 is attached proximate the second ends 146 of the plates 141 of rear spring shackle 140 such that the apertures 149 are aligned with a passageway through the shackle spacer 145.

The front spring shackle 142 is identical to the rear spring shackle 140 and includes identical inner and outer plates 141 and a shackle spacer (not shown). The inner plate 141 of the front spring shackle 142 is spaced from the outer plate 141 of the front spring shackle 142 by the shackle spacer. Each plate 141 of the front spring shackle 142 has a first end 144 and a second end 146. The inner surface of the outer plate 141 of the front spring shackle 142 abuts the outer surface of the outer plate of the front link arm 96. The outer surface of the inner plate 141 abuts the inner surface of the inner plate of the front link arm 96. The first ends 144 of the plates 141 of the front spring shackle 142 are pivotally attached to the front link arm 96 by passing a shoulder bolt 143 through the first shackle aperture 147 of the inner plate 141, through the passageway of the shaft and through the aperture 147 of the outer plate 141. A locking nut is provided on the shoulder bolt 143 to secure the shackle 142 to the link arm 96. The shackle spacer is attached proximate the second ends 146 of the plates 141 of the front spring shackle 142 such that the apertures 149 are aligned with a passageway through the spacer.

A rear leaf spring 150 has a rear end 152 and a front end 154. The rear end 152 is attached to the frame 22 of the vehicle through a rear spring bracket 156. The front end 154 of the rear leaf spring 150 is mounted on the rear shackle spacer 146 of the rear spring shackle 140. The rear leaf spring 150 supports the rear axle 158.

A front leaf spring 160 has a rear end 162 and a front end 164. The front end 164 is attached to the frame 22 of the vehicle through a front spring bracket 166. The rear end 162 of the front leaf spring 160 is mounted on the front shackle spacer of the front spring shackle 142. The front leaf spring 160 supports the front axle 168.

Although the leaf springs 150, 160 are shown in an underslung position, it is to be understood that the leaf springs 150, 160 can be mounted in either the underslung manner or the overslung manner.

As shown in FIG. 2, the suspension system 120 includes four major subassemblies: a main body weldment 200; the cross shaft weldments 202, the slack adjuster assemblies 204 and the air spring mount weldments 206.

The main body weldment 200 includes the structural items necessary to support the cross shafts 80, 82 with the slack adjuster assemblies 204 and the air spring mount weldments 206 while providing attachment to the trailer frame 22 and to the leaf springs 150, 160. The main body weldment 200 includes the outer bearing bracket 50, the inner bearing bracket 56, the I-beam 36, the bearing brace 69, the first bracket attachment 32, the second bracket attachment 34, the bracket spacers 30, and the base brace 48.

The cross shaft weldments 202 provide direct attachment to the leaf springs 150, 160 and to the slack adjuster assemblies 204, providing a path for transfer of forces from the leaf springs 150, 160 to the air spring 120. The cross shaft weldments 202 include the rear cross shafts 80 the front cross shaft 82, the rear spring arm 84, the front spring arm 96, the rear spring arm spacer 94, and the front spring arm spacer.

The slack adjuster subassemblies 204 ride on the cross shafts 80, 82 and link to the cross shafts 80, 82 and the air spring mount weldments 206. The slack adjuster assemblies 204 provide latitude for the adjustment in the ride height by virtue of the ability to reposition the cross shaft weldments 202 in relation to the air spring 120 as will be described below.

The air spring mount weldments 206 connect the slack adjuster assemblies 202 to the air spring 120. The air spring mount weldments 206 include the rear plate 122, front plate 124, the rear air bag attachment bracket 128 and the front air bag attachment bracket 136.

Now that the specifics of the structure of the suspension system 20 have been described, installation and operation of the invention will be described.

The isolator 20 can be used in connection with a tandem suspension or a multi-axle suspension. In the tandem axle suspension two center frame hangers are provided between the front and the rear axle, one on the left side of the vehicle and one on the right side of the vehicle. An isolator 20 is mounted to each frame hanger.

Thus, a suspension system incorporating the isolator 20 requires only two springs whereas prior art independent systems required four. In a tri-axle suspension, for example, two center frame hangers are provided on the left side of the vehicle (a first between the front axle and the center axle and a second between the center axle and the rear axle) and two center frame hangers are provided on the right side of the vehicle (a first between the front axle and the center axle and a second between the center axle and the rear axle). An isolator 20 is mounted to each of the four frame hangers. Thus, a suspension system incorporating the isolator 20 requires only four springs whereas the prior art independent systems required six springs.

After mounting the isolator 20 to the vehicle and mounting the leaf springs on the shackles 140, 142, if an air spring 120 is used rather than a rubber spring, for example, the air spring 120 is inflated to a sufficient pressure to yield the optimum operation range. In the preferred embodiment, the overall length of the air spring 120 between the front plate 124 and the rear plate 122 should be approximately five inches. This distance provides proper operational range of the air spring 120 and maximum conditions for ideal ride qualities.

The isolator 20 works to equalize the load between the front axle 168 and the rear axle 158. The weight of the vehicle on the axles 158, 168 results in a constant compression force applied to the air spring 120. With correct inflation of the air spring 120, the load is balanced at the center fulcrum points of the front and rear leaf springs 160, 150 and neither the front plate 124 nor the rear plate 122 is pulled. The static load on the leaf springs 160,150 maintains pressure on both plates 122, 124 and maintains a compression force on the spring 120.

By mounting the air spring 120 horizontally, the isolator 20 simultaneously provides dampening for two axles and dissipates force such that minimal force is transmitted to the vehicle frame.

By maintaining specific air pressure, the air spring 120 provides compliant dampening to achieve ideal ride qualities. The spring 120 functions to dampen the rough bumps and vibrations to provide a cushioned ride. In operation, when the front wheels of the vehicle, mounted to the front axle 168, encounter a condition, such as, for example, a pothole in the road causing downward vertical movement of the front axle 168, the front leaf spring 160 will be deflected. From the vantage point of FIG. 8, this deflection causes the front spring shackle 142 to pivot counter-clockwise about the point where the front spring shackle 142 is attached to the front spring arm 96. Front spring arm 96 will also rotate in the counter-clockwise direction. Because the front spring arm 96 is fixed to the front shaft 82, rotation of the front spring arm 96 also rotates the front shaft 82. The splined portion 82a of the front shaft 82 mates with the splined portion of the front slack adjuster 110, causing the front slack adjuster 110 to rotate in the counter-clockwise direction. As the front slack adjuster 110 rotates counter-clockwise, the arm 114 of the slack adjuster 110 rotates and causes the air bag 120 to expand in the forward direction. Thus as the leaf spring 160 reacts, the reaction is transmitted to the front cross shaft 82 which rotates on the bearings 66, 68 and transmits the force experienced by the leaf spring 160 to the air bag 120.

The rear side of the suspension system operates in a manner identical to the front side of the suspension system. For example, if a bump is encountered by the rear wheels and causes the rear axle 158 to be displaced vertically upward, the leaf spring 150 will move upward causing the rear spring shackle 140 to rotate in the counter-clockwise direction about a point where the rear spring shackle 140 is attached to the rear spring arm 84. As a result of the rotation of the rear spring shackle 140, the rear spring arm 84 will also rotate in the counter clockwise direction. Because the rear spring arm 84 is attached to the rear shaft 80 the rear shaft 80 will also rotate. As the rear shaft 80 rotates, the rear slack adjuster 102 will also rotate. The attachment between the arm 106 of the rear slack adjuster 102 and the air bag attachment bracket 128 will result in contraction of the air bag 120 or displacement of the air bag 120 in the forward direction.

The isolator 20 also provides for the ability to adjust the ride height of the vehicle. The ride height of the vehicle can be raised and lowered by adjusting the rear and front slack adjusters 102, 110. To set the ride height level, the slack adjusters 102, 110 are rotated in connection with the cross shafts 80, 82 to raise or lower the springs arms 84, 96. The rear slack adjuster 102 is rotated using the adjusting screw 107. As the rear slack adjuster 102 is rotated, the shaft 80 and the spring arm 84 are also rotated causing the rear leaf spring 150 to be raised or lowered which results in the axle 158 being raised or lowered relative to the deck of the trailer. The height of the front axle 168 is raised or lowered in the same manner by rotating the adjusting screw 107 on the front slack adjuster 110. The ride height of the vehicle can also be adjusted by replacing the inner and outer plates 141 of the front and rear spring shackles 140, 142 with plates of a different length. By providing longer plates 141, the front and rear leaf springs 150, 160 are raised resulting in the front and rear axles 158, 168 being raised relative to the trailer deck. Therefore, when longer plates 141 are provided, the distance between the trailer deck and the axles 158, 168 is shortened which serves to lower the trailer deck. Alternatively, shorter plates 141 can be provided thereby lowering front and rear leaf springs 150, 160 and the front and rear axles 158, 168 relative to the trailer deck. Therefore, when shorter plate 141 are provided, the distance between the trailer deck and the axles 158, 168 is increased which serves to raise the trailer deck.

Figure 9:
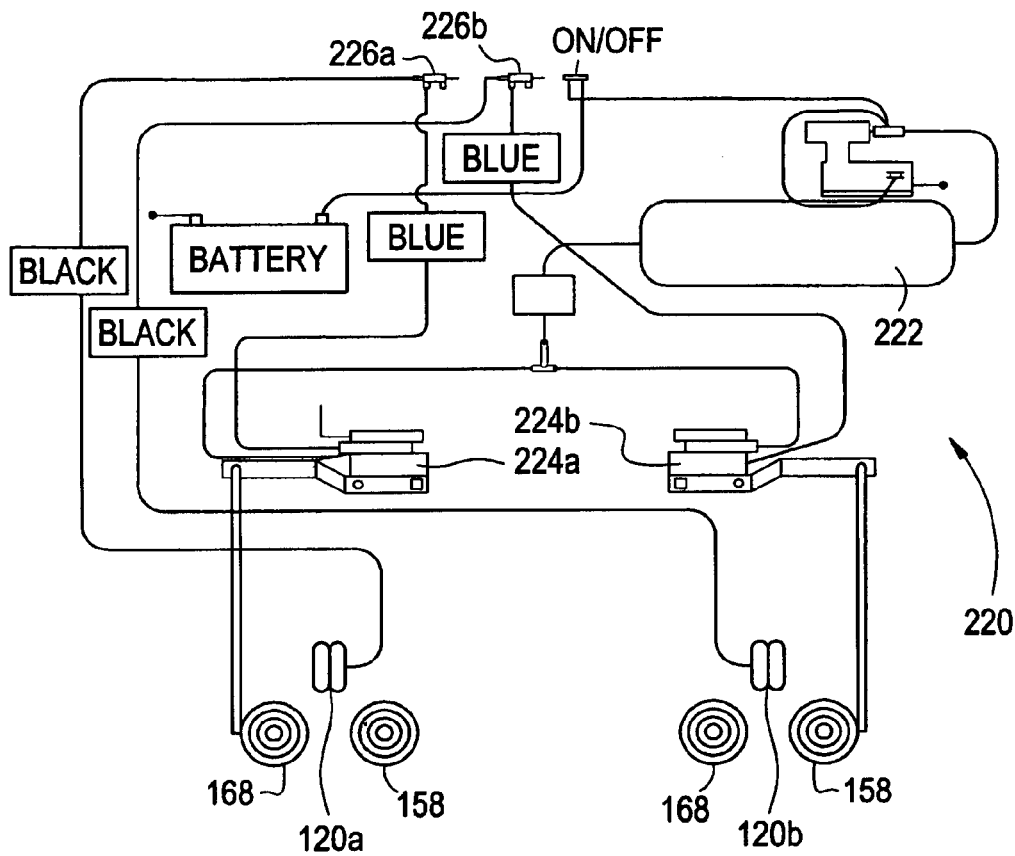
FIG. 9 is a diagram of a ride height control system used in connection with the suspension isolator of FIG. 2.

If air springs 120 are used in the isolator 20, rather than rubber springs, the air springs 120 can be incorporated into a ride height control system 220 as shown in FIG. 9. The ride height control system 220 uses a device (not shown) for sensing the relative position between the axles 158, 168 and the frame 22. For example, a distance measuring device can be used to measures the distance between the axles 158 or 168 and the frame 22. The ride height control system 220 includes the air spring 120 mounted between the front axle 168 and the rear axle 158 near the left side of the vehicle and the air spring 120 mounted between the front axle 168 and the rear axle 158 mounted near the right side of the vehicle. Air is supplied to the springs 120 from a compressor 222, through left and right ride height control valves 224a, 224b. The ride height control valves 224a, 224b can be for example mercury filed mechanical devices. Unlike the control valves 224a, 224b which operate on a vertical plane, the electronic ride height control devices which do not require operation on a vertical plane could be used. For example, an electronic device which measures the length of the air spring can be used to control the ride height.

If a low condition is sensed (i.e. the distance between the frame 22 and axle 158 or 168 is too small), air is provided from the compressor 222, to the springs 120 allowing air volume in the air springs 120 to increase thereby expanding the air springs 120. As the air springs 120 are expanded the slack adjusters 102, 110 move away from each other and cause the rear and front cross shafts 80, 82 to rotate. Rotation of the rear and front cross shafts 80, 82 results in rotation of the rear and front link arms 84, 96 and lowering of the shaft to which the shackles 140, 142 are attached. As a result the rear and front leaf springs 150, 160 along with the rear and front axles 158, 168 are lowered, thereby increasing the distance between the frame 22 and the axles 158, 168.

In addition to maintaining the ride height, the ride height control mechanism 220 can be used to allow lowering of the vehicle when it is stationary and not in operational use. The ride height is lowered by evacuating the air from the air springs 120 using the left and right dump valves 226a, 226b. Evacuating air from the springs 120 allows the slack adjuster assemblies 204 to rotate towards each other, as the springs 120 deflate. As the slack adjuster assemblies 204 rotate towards each other, the front and rear leaf springs 160, 150 will lower, causing the front and rear axles 168, 158 to be lowered. This function allows a general lowering of the vehicle for loading, stabilizing or other activities when the vehicle is not in motion. Finally, the compressor 222 can provide air volume to recharge the air springs 120a 120b before moving the vehicle.

Figure 10:
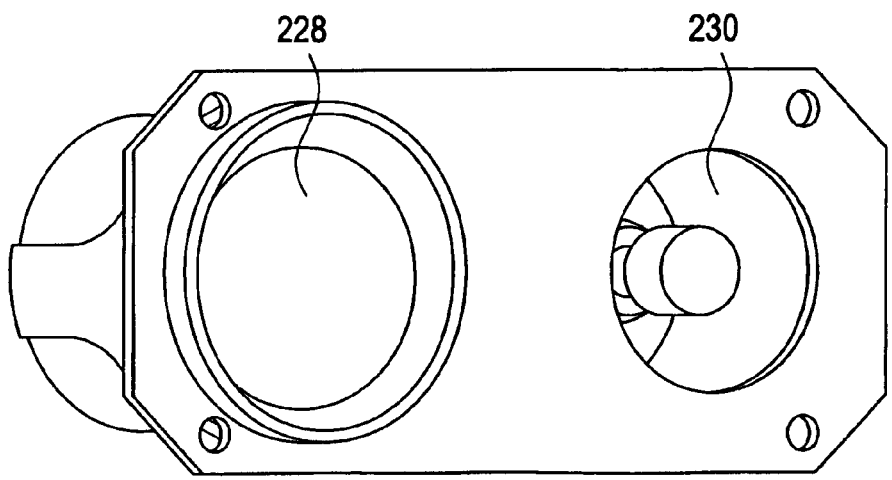
FIG. 10 is a perspective view of a panel mounted gauge and fill valve which can be used in connection with the suspension isolator of FIG. 2.

A panel mounted air gauge 228 and air valve 230 are shown in FIG. 10. The panel mount air gauge 228 and air valve 230 can be used instead of the ride height control system 220 or in conjunction with the ride height control system 220. An air hose is provided between the air valve 230 and the air spring 120 to supply air to the air spring 120. The air gauge 228 is in fluid communication with the air spring 120 and provides a measure of the air pressure within the air spring 120. The air gauge 228 and air valve 230 can be mounted to the vehicle in a location which can be conveniently accessed. Once the optimum ride height has been determined, the air gauge 228 and air valve 230 can be used to maintain the optimum ride height as weight is added or removed from the trailer. A formula is used to determine the air pressure to be provided in the system to maintain the optimum ride height. The formula is reflective of the size of the air spring and the mechanical advantages provided by the isolator 20. For example, in the preferred embodiment, 5 psi of air is to be provided for every 1000 lbs of tandem axle weight. In a tri-axle system, 2.5 psi is to be provided for every 1000 lbs of axle weight. In a four-axle system, 1.25 psi is to be provided for every 1000 lbs of axle weight.

Figure 11:
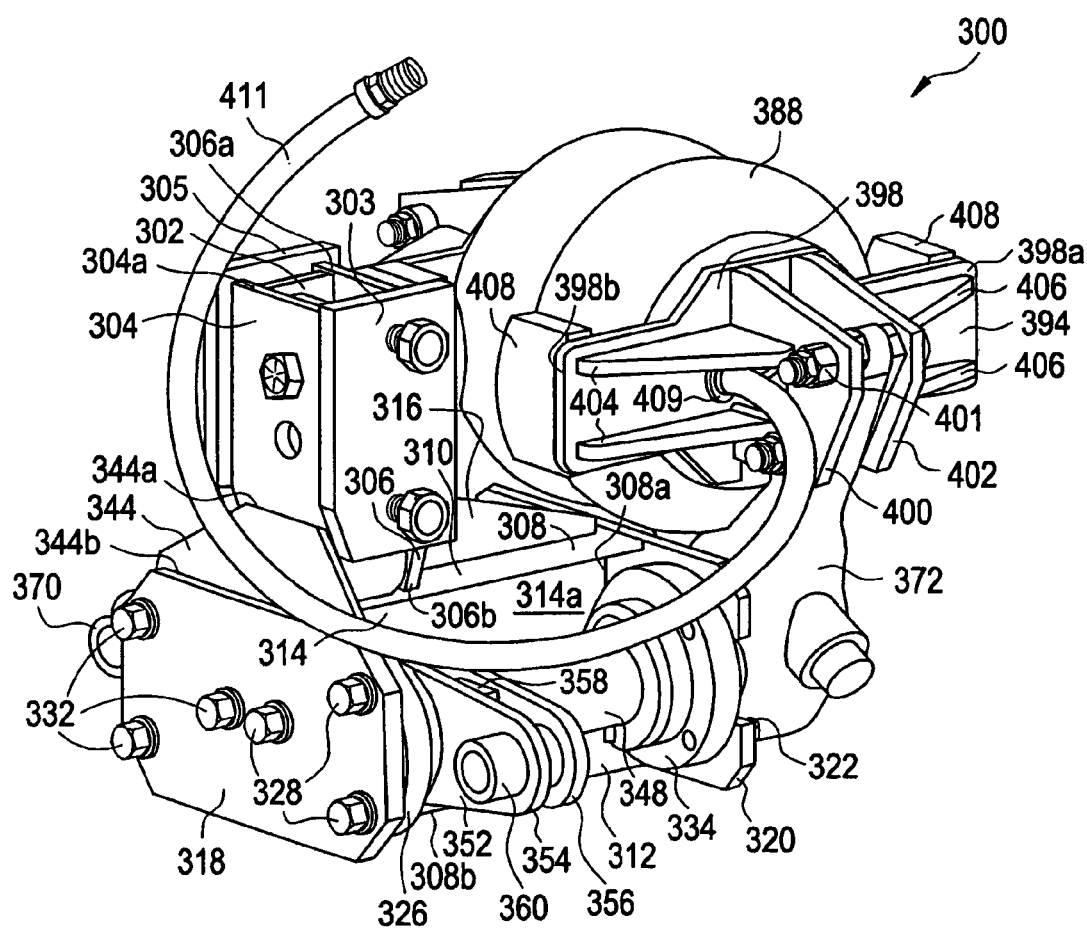
FIG. 11 is a perspective view of a second embodiment of the suspension isolator which incorporates features of the present invention.

Attention is invited to the second embodiment of the invention shown in FIGS. 11–14. As shown in FIG. 11, the suspension isolator 300 includes a frame bracket 302 for mounting the isolator 300 to the frame (not shown) of the vehicle. The frame bracket 302 attaches to the center frame hanger of the vehicle by suitable means. The frame bracket 302 includes a first bracket attachment 304, a second bracket attachment 306, a front plate 303 and a rear plate 305. The first and second bracket attachments 304, 306 extend between the front and rear plates 303, 305 and are generally perpendicular thereto. The first and second bracket which extend downwardly from the frame of the vehicle by suitable means.

The first bracket attachment 304 is preferably metal. The first bracket attachment 304 is elongated and includes a first end 304a and a second tapered end 304b. The first end 304a of the bracket is positioned proximate the frame of the vehicle.

The second bracket attachment 306 is also metal and is spaced from the first bracket attachment 304. The second bracket attachment 306 is elongated and includes a first end 306a and a second tapered end 306b. The first end 306a of the bracket 306 is positioned proximate the frame of the vehicle.

An I-beam 308 is positioned proximate the second ends 304b, 306b of the bracket attachments 304, 306, and is preferably metal. The I-beam 308 includes an upper horizontal member 310 and a lower horizontal member 312 which is parallel to the upper horizontal member 310. A vertical member 314 attaches the upper horizontal member 310 to the lower horizontal member 312. The vertical member 314 has a front side 314a and a rear side (not shown). The I-beam 308 includes an inner end 308a an outer end 308b. The top surface of the upper horizontal member 310 abuts the second ends 304b, 306b of the first and second bracket attachments 304, 306 and is attached thereto, proximate the outer end 308b of the I-beam 308 by suitable means such as welding.

A base brace 316 is mounted to the top surface of the upper horizontal member 310 of the I-beam 308. The base brace 316 is preferably metal and is generally triangularly shaped. A lower edge of the base brace 316 is fixed to the top surface of the upper horizontal member 310 by suitable means such as welding, and extends from the second bracket attachment 306 to the inner end 308a of the I-beam 308. An outer edge of the base brace 48 is fixed to the inner surface of the second bracket attachment 306 by suitable means such as welding.

An outer bearing bracket 318 is mounted on the outer end 308b of the I-beam 308, perpendicular to the I-beam 308 and parallel to the first and second bracket attachments 304, 306. The outer bearing bracket 318 is generally rectangularly shaped and includes six apertures therethrough used to mount the outer bearings as will be described herein. An inner bearing bracket 320, identical to the bearing bracket 50, 56 shown in FIG. 5, is mounted on the inner end 308a of the I-beam 308, perpendicular to the I-beam 308 and parallel to the first and second bracket attachments 304, 306. The inner bearing bracket 320 is generally rectangularly shaped and includes a forward C-shaped opening 322 and a rearward C-shaped opening (not shown). The inner bearing bracket 320 also includes six aperture therethrough used to mount the inner bearings as will be described herein.

The outer bearing bracket 318 supports a front outer bearing 326 through bolts 328 mounted within the apertures through the outer bearing bracket 318. The outer bearing bracket 318 also supports a rear outer bearing 330 (see FIG.

13) through bolts 332 mounted within the apertures through the outer bearing bracket 318.

The inner bearing bracket 320 supports a front inner bearing 334 with the forward facing C-shaped aperture 322 and through bolts 336 mounted within the apertures through the inner bearing bracket 320. The inner bearing bracket 320 also supports a rear inner bearing 338 through bolts 340 mounted within the apertures through the inner bearing bracket 320.

Each bearing 326, 330, 334, 338 is identically formed and includes a first portion and a second portion. The first portion of each bearing 326, 330, 334, 338 is mounted to the respective bearing bracket 318, 320 and the second portion is capable of rotation relative to the first portion.

A bearing brace 344 is positioned near the outer end 308b of the I-beam 308. The bearing brace 344 includes a top 344a and a bottom 344b and is preferably metal. The width of the bearing brace 344 is smaller proximate the top 344a than proximate to the bottom 344b. The top 344a of the bearing brace 344 abuts the outer surface of the first bracket attachment 304 and is attached thereto by suitable means, such as welding. The bottom 344b abuts the outer bearing bracket 318 and the I-beam 308 and is attached thereto by suitable means such as welding.

An elongated front cross shaft 348 extends between the front outer bearing 326 and the front inner bearing 334. The inner end of the front cross shaft 348 extends through the inner bearing 334 and through the inner bearing bracket 320. A portion of the front cross shaft 348, proximate the inner end is splined similar to the front cross shaft 82 of the first embodiment.

An elongated rear cross shaft 350 extends between the rear outer bearing 330 and the rear inner bearing 338. The inner end of the rear cross shaft 350 extends through the rear inner bearing 338 and through the inner bearing bracket 320. A portion of the rear cross shaft 350, proximate the inner end is splined similar to the rear cross shaft 80 of the first embodiment.

A front link arm 352 is mounted to the front cross shaft 348. The front link arm 352 includes an inner plate 354 and an outer plate 356 which are spaced apart from one another. The inner and outer plates 352, 354 are generally triangularly shaped and each plate 352, 354 includes a shaft opening and a link eye opening. The front cross shaft 348 passes through the shaft openings and is fixed to the plates 352, 354 by suitable means such as, for example, welding. A stiffening spacer 358 is provided between the inner and outer plates 354, 356, proximate the shaft openings. A shaft 360 which may be formed from a steel pipe having a brass bushing therein is mounted within the link eye openings. A portion of the shaft 360 extends beyond the outer surface of the outer plate 354 and a portion of the shaft 360 extends beyond the inner surface of the inner plate 356.

Figure 7:
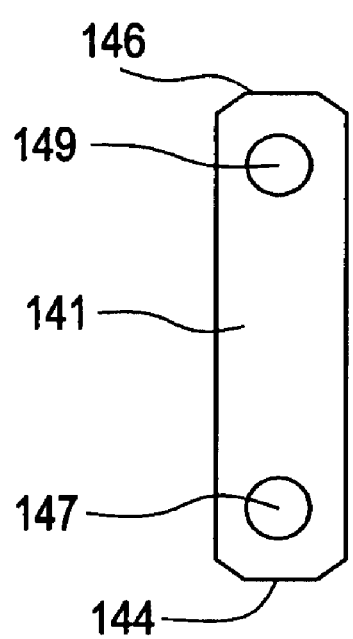
FIG. 7 is an elevational view of a shackle plate of the suspension isolator of FIG. 2.
Figure 7A:
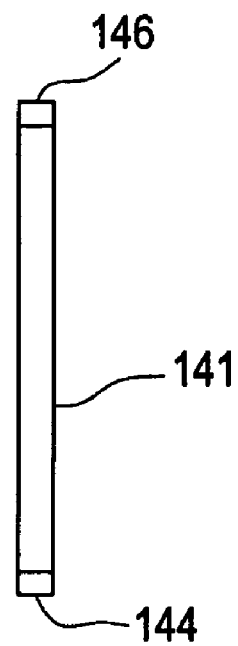
FIG. 7a is a side view of the shackle plate of FIG. 7.

A spring shackle (not shown) identical to the spring shackle of the first embodiment is mounted to the shaft 369 as described with respect to the first embodiment. The spring shackle includes identical inner and outer shackle plates 141. The shackle plates 141, as shown in FIG. 7, include a first end 144 and a second end 146. A first shackle aperture 147 is provided at the first end 144 of each shackle plate 141 and a second shackle aperture 149 is provided at the second end of each shackle plate 141. A shoulder bolt and locking nut are provided for mounting the shackle plates 141 to the shaft 360 of the spring arm 352.

A rear link arm 362 is mounted to the rear cross shaft 350. The rear link arm 360 includes an inner plate 364 and an outer plate 366 which are spaced apart from one another. The inner and outer plates 364, 366 are generally triangularly shaped and each plate 364, 366 includes a shaft opening and a link eye opening. The rear cross shaft 350 passes through the shaft openings and is fixed to the plates 364, 366 by suitable means such as, for example, welding. A stiffening spacer 368 is provided between the inner and outer plates 364, 366, proximate the shaft openings. A shaft 370 which may be formed from a steel pipe having a brass bushing therein is mounted within the link eye openings. A portion of the shaft 370 extends beyond the inner surface of the inner plate 364 and a portion of the shaft 370 extends beyond the outer surface of the outer plate 366.

A spring shackle (not shown), identical to the spring shackle of the first embodiment, includes inner and outer shackle plates 141. A shoulder bolt and locking nut are provided for mounting the shackle plates 141 to the steel pipe 370 of the rear spring arm 362.

Figure 12:
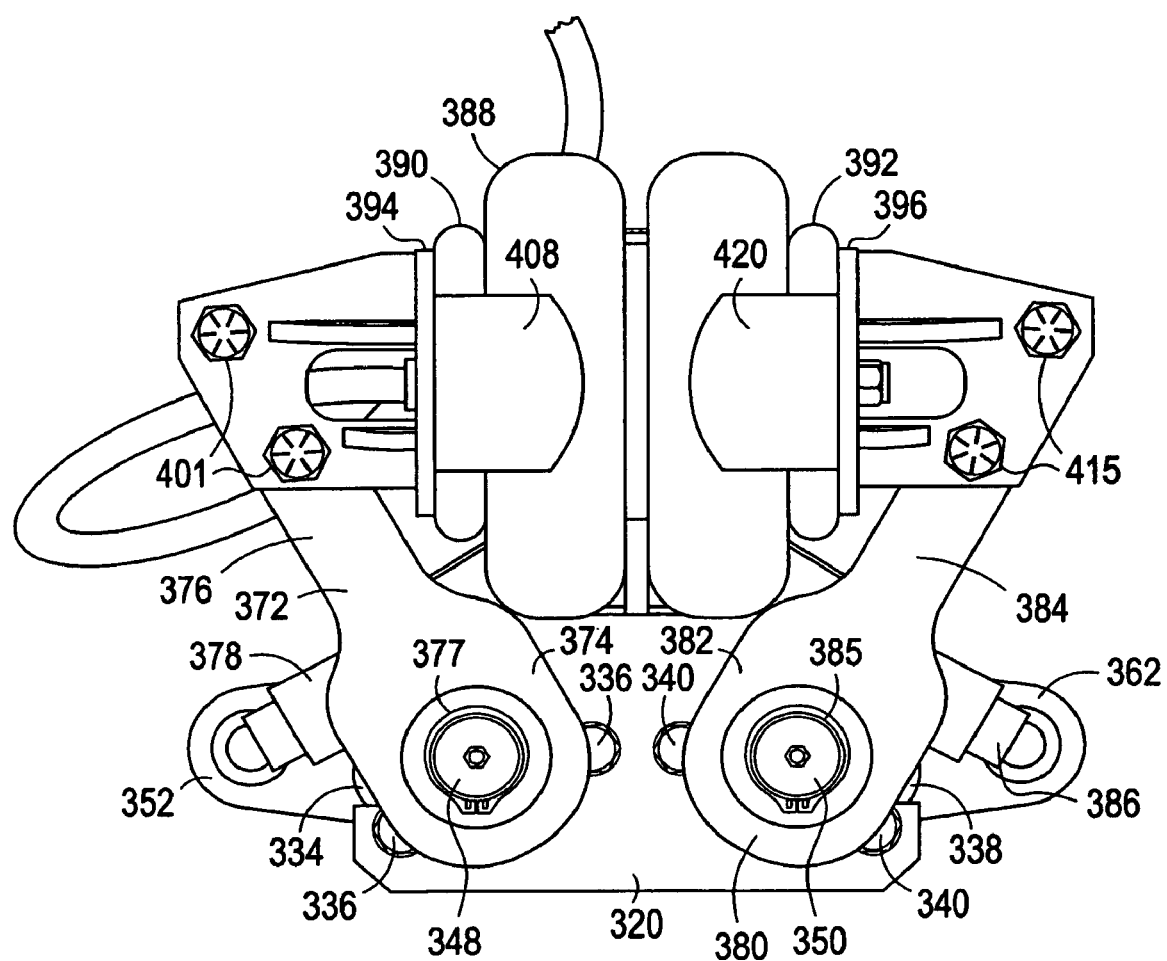
FIG. 12 is a right side view of the suspension isolator of FIG. 11.
Figure 13:
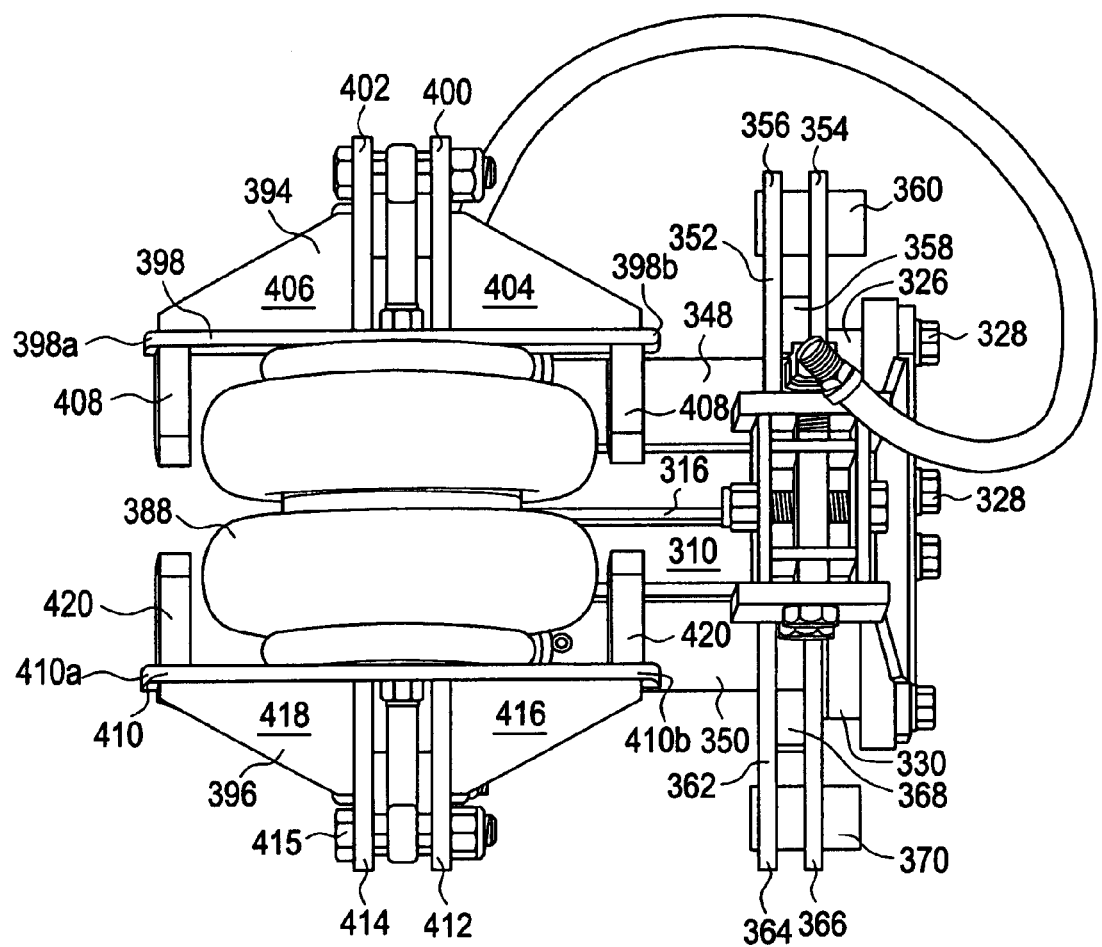
FIG. 13 is a top plan view of the suspension isolator of FIG. 11.
Figure 14:
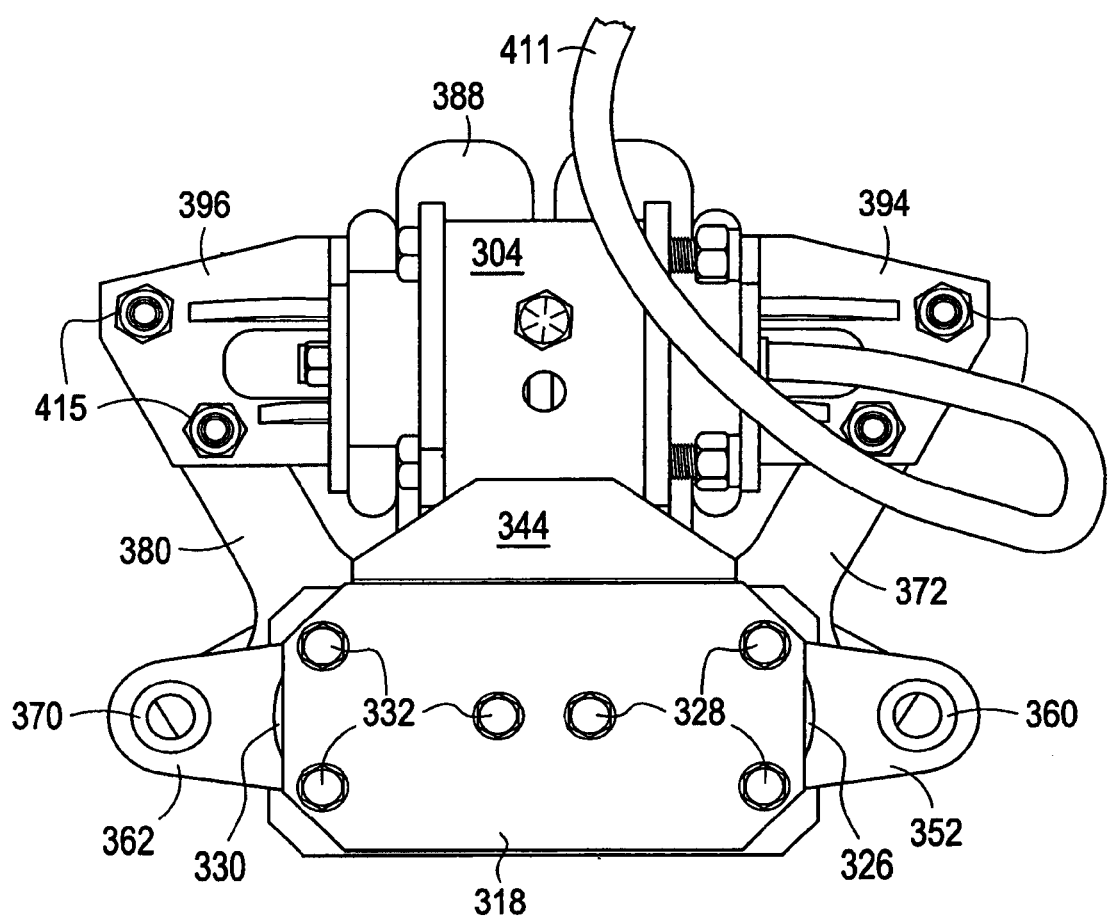
FIG. 14 is a left side view of the suspension isolator of FIG. 11.
Figure 15:
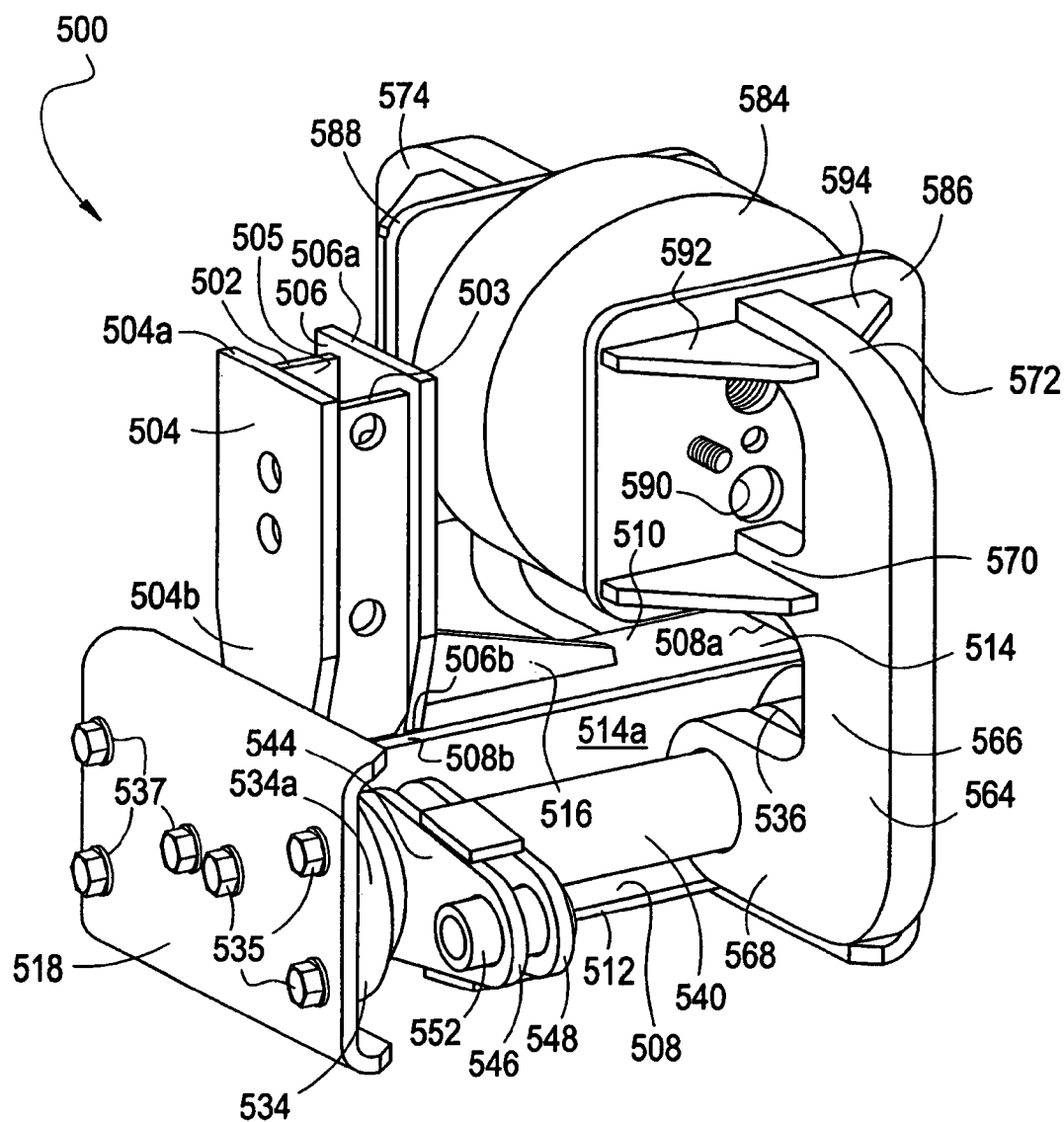
FIG. 15 is a perspective view of a third embodiment of the suspension isolator which incorporates features of the present invention.
Figure 16:
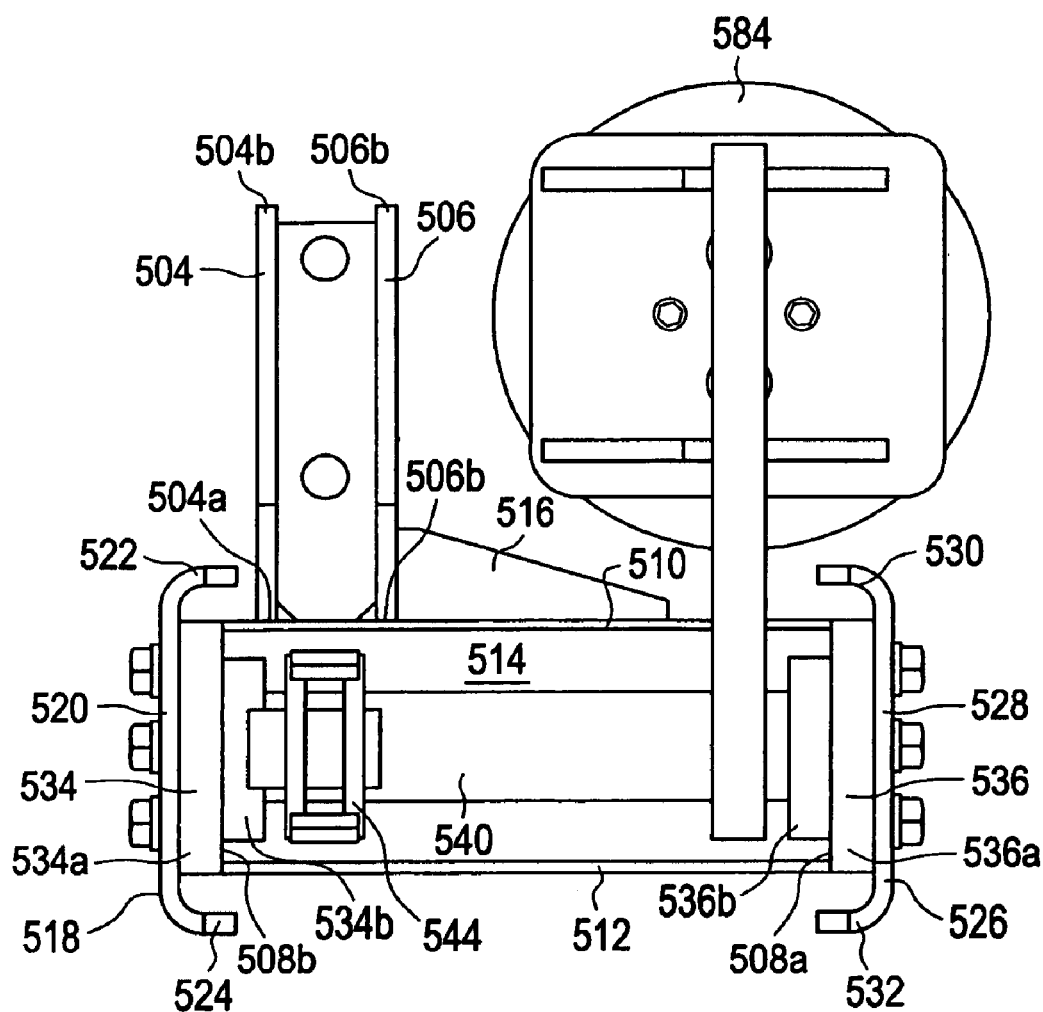
FIG. 16 is a front elevational view of the suspension isolator of FIG. 15.
Figure 17:
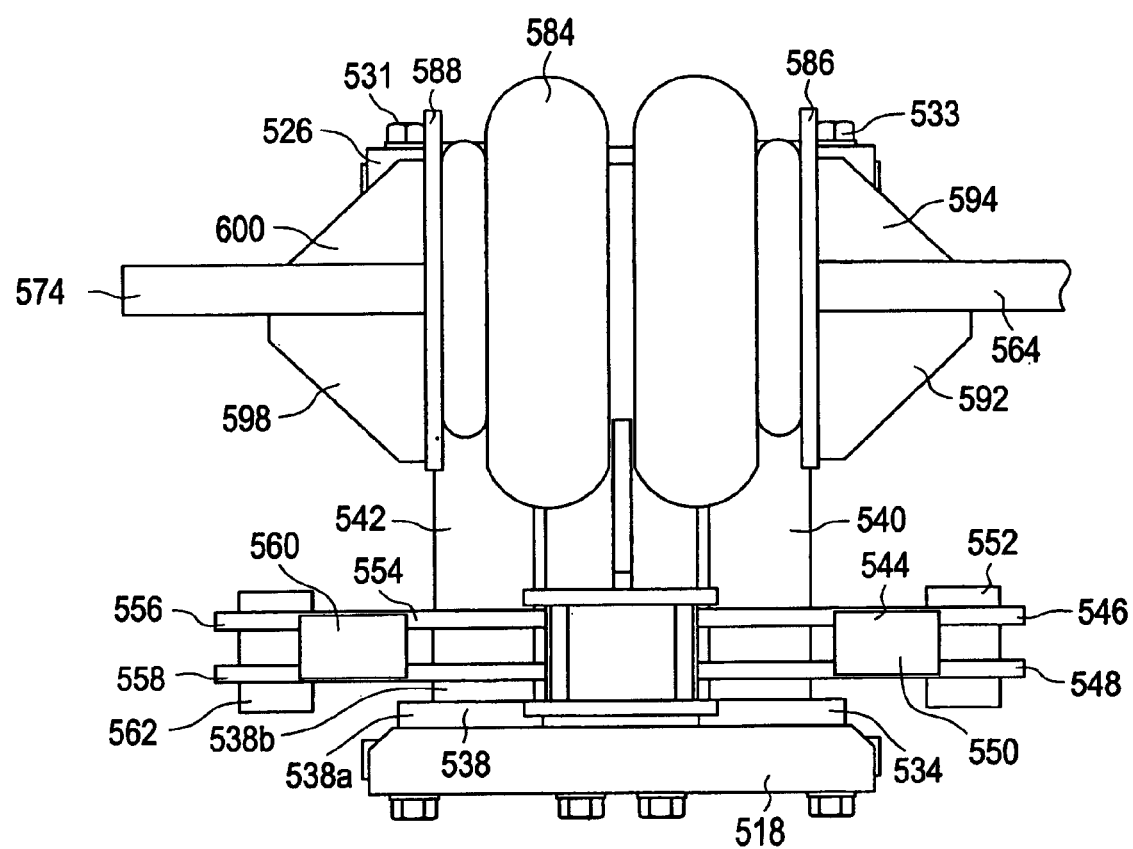
FIG. 17 is a top plan view of the suspension isolator of FIG. 15.
Figure 18:
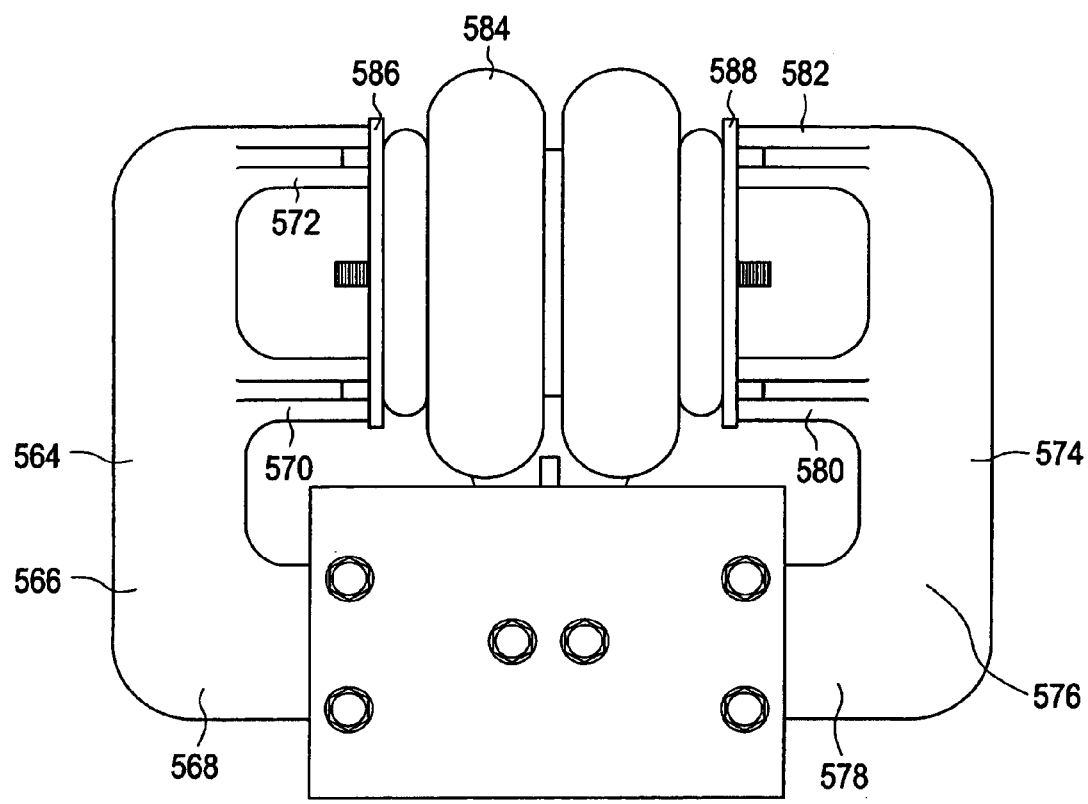
FIG. 18 is a right side view of the suspension isolator of FIG. 15.

As shown in FIG. 12, a front transitional arm 372 is mounted on the splined portion of the front cross shaft 348. The front transitional arm 372 is provided in the form of a slack adjuster 372. The slack adjuster 372 can be, for example, a standard brake slack adjuster found on air brake trailer axles. The front slack 372 includes a body 374 and a generally upwardly extending arm 376. An aperture is provided in the body 374 for receiving the splined portion of the front cross shaft 348. The aperture has a spline which mates with the splined portion of the front cross shaft 348. A snap ring 377 is provided around the inner end of the front cross shaft 348 to further secure the slack adjuster 372 to the shaft 348. An adjusting screw 378 is provided within the body 374 of the front slack adjuster 372 to set the ride height as will be described herein.

A rear transitional arm 380 is mounted on the splined portion of the rear cross shaft 350. The rear transitional arm 380 is provided in the form of a slack adjuster 380 and is identical to the front slack adjuster 372. The rear slack adjuster 380 includes an oblong body 382 and a generally upwardly extending arm 384. An aperture is provided in the body 382 for receiving the splined portion of the rear cross shaft 350. The aperture has a spline which mates with the splined portion of the rear cross shaft 350. A snap ring 385 is provided around the inner end of the rear cross shaft 350 to further secure the slack adjuster 380 to the rear cross shaft 350. An adjusting screw 386 is provided within the body 382 of the rear slack adjuster 380 is used to set the ride height as will be described herein.

A generally cylindrically shaped air bag 388 is provided between the arm 384 of the rear slack adjuster 380 and the arm 376 of the front slack adjuster 372. The air bag 388 is mounted horizontally and has a front end 390 and a rear end 392. Although the system is described using an air bag 388, as discussed with respect to the isolator 20, alternatively a steel spring, a coil spring, a rubber spring or other composite material could be used for dampening.

An oblong shaped front air bag attachment bracket 394 is attached to the front end 390 of the air bag 388, and an oblong shaped rear air bag attachment bracket 396 is attached to the rear end 392 of the air bag 388. The front and rear air bag attachment brackets 394, 396 are identical and preferably formed from metal.

The front air bag attachment bracket 394 generally includes a base 398 having an inner end 398a and an outer end 398b, an outer arm support 400, an inner arm support 402, support ribs 404, support ribs 406 and safety stops 408. Base 398 relates to air bag 388. The outer and inner arm supports 400, 402 extend perpendicularly from the base 398 opposite the air bag 388. The outer and inner arm supports 400, 402 are spaced apart and receive the arm 376 of the front slack adjuster 372. The arm 376 of the front slack adjuster 372 is secured to the inner and outer arm supports 400, 402 through bolts 401. The support ribs 404 extend perpendicularly from the base 398 and connect to the outer surface of the outer arm support 400. The support ribs 404 are spaced from one another. The support ribs 406 extend perpendicularly from the base 398 and connect to the inner surface of the inner arm support 402. The support ribs are spaced from one another. A first safety stop 408 extends from base portion 398 proximate the inner end 398a of the base portion 398. A second safety stop 408 extends from the base portion 398 proximate the outer end 398b of the base portion 398. The safety stops 408 extend from the surface of the base portion 398 proximate the air bag 388 and along a predetermined length of the air bag 388. The safety stops 408 are generally perpendicular to the base 398 and prevent damage to the air bag 388 as will be described herein. An air hose aperture 409 is provided through the base portion 398 and is positioned between the inner extensions 404. An air hose 411 is attached to the air hose aperture 409 and provides air to the air bag 388 as will be described herein.

The rear air bag attachment bracket 396 is mounted to the rear end 392 of the air bag 388. The rear air bag attachment bracket 396 generally includes a base 410 having an inner end 410a and an outer end 410b, an outer arm support 412, an inner arm support 414, outer support ribs 416, inner support ribs 418, and safety stops 420. Base 410 relates to the air bag 388. The outer and inner arm supports 412, 414 extend rearward and perpendicularly from the base 410 opposite the air bag 388. The outer and inner arm supports 412, 414 are spaced apart and receive the arm 384 of the rear slack adjuster 380. The arm 384 of the rear slack adjuster 380 is secured to the inner and outer arm supports 412, 414 through bolts 401. The support ribs 416 extend perpendicularly from the base 410 and connect to the outer arm support 412. The outer extensions 416 also extend perpendicularly from the base 410. The support ribs 416 are spaced from one another. The support ribs 418 extend perpendicularly from the base 410 and connect to the inner arm support 414. The inner extensions 418 also extend perpendicularly from the base 410. The support ribs 418 are spaced from one another. A first safety stops 420 extends from the base portion 410 proximate the inner end 410a of the base portion 410. A second safety stop extends from the base portion 410 proximate the outer end 410b of the base portion 410. The safety stops 420 extend from the surface of the base portion 410 proximate the air bag 388 and along a predetermined length of the air bag 388. The safety stops 420 are generally perpendicular to the base 410 and prevent damage to the air bag 388 as will be described herein. Although, the isolator has been described as having an air hose aperture through the front air bag attachment 394, it is to be understood that an air hose attachment aperture could be provided through the rear air bag attachment 396 to supply air to the air bag 388.

Front and rear leaf springs (not shown) are mounted to the isolator 300 in a manner identical to that described with respect to isolator 20. The front leaf spring is mounted between the second ends 146 of the shackle plates of the front spring shackle and the frame of the vehicle and the rear leaf spring is mounted between the second ends of the shackle plates of the rear spring shackle and the frame of the vehicle.

After mounting the isolator 300 to the vehicle, and mounting the ends of the leaf springs to the front and rear spring shackles, air is provided through the air hose 411 to inflate the air bag 388 to a sufficient pressure to yield optimum operation range. The operation of the isolator 300 is identical to the operation of the isolator 20 described above. The safety stops 408, 420 of the isolator 300 provide an additional advantage. In the event air pressure is lost in the air bag 388, the air bag 388 will begin to collapse causing the front and rear air bag attachment brackets 394, 396 to move toward one another. As the brackets 394, 396 move toward one another, the front safety stops 408 will abut the rear safety stops 420 to prevent the air bag 388 from completely collapsing and thus damage to the air bag 388 will be prevented. Should the system loose air, the vehicle will continue to operate. The safety stops 408, 420 are particularly useful when a smaller air bag is used. As smaller air bags typically do not include an internal bumper which would restrict collapse of the air bag 388. Although the isolator 300 has been shown and described as including two pair of safety stops 408, 420, only one pair of safety stops is required to restrict collapse of the air bag.

In the same manner as the isolator 20, the isolator 300 provides the ability to adjust the ride height of the vehicle. In particular, the ride height of the vehicle can be raised and lowered by adjusting the front and rear slack adjusters 372, 380 or by lengthening or shortening the shackle plates.

Attention is invited to the third embodiment of the isolator 500 shown in FIGS. 15–18. Unlike the isolators 20 and 300 described above, the isolator 500 does not include slack adjusters for adjusting the ride height.

The isolator 500 includes a frame bracket 502 for attaching the isolator 500 to the frame of the vehicle. The frame bracket 502 includes a first bracket attachment 504, a second bracket attachment 506, a front plate 503 and a rear plate 505. A first bracket attachment 504 is positioned at the outer end of the frame bracket 502 and a second bracket attachment 506 is positioned at the inner end of the frame bracket 502. The front plate 503 extends between the first and second bracket attachments 504, 506 and is generally perpendicular thereto. The rear plate 505 extends between the first and second bracket attachments 504, 506 and is generally perpendicular thereto.

The first bracket attachment 504 is preferably metal. The first bracket attachment 504 is elongated and includes a first end 504a and a tapered second end 504b. The first end 504a of the bracket is positioned proximate the frame of the vehicle.

The second bracket attachment 506 is metal and is generally parallel to the first bracket attachment 504 and spaced therefrom. The second bracket attachment 506 is elongated and includes a first end 506a and a tapered second end 506b. The first end 506a of the bracket is positioned proximate the frame of the vehicle.

An I-beam 508 is positioned proximate the second ends 504a, 506a of the bracket attachments 504, 506 and is preferably metal. The I-beam 508 includes an upper horizontal member 510 and a lower horizontal member 512 which is parallel to the upper horizontal member 510. A vertical member 514 attaches the upper horizontal member 510 to the lower horizontal member 512. The vertical member 514 has a front side 514a and a rear side (not shown). The I-beam 508 includes an inner end 508a and an outer end 508b. The top surface of the upper horizontal member 510 abuts the second ends 504a, 504b of the first and second bracket attachments 504, 506 and is attached thereto, proximate the outer end 508b of the I-beam 508 by suitable means such as welding.

A base brace 516 is mounted to the top surface of the horizontal member 510 of the I-beam 508. The base brace 516 is preferably metal and is generally triangularly shaped. A lower edge of the base brace 516 is fixed to the top surface of the upper horizontal member by suitable means such as welding, and extends from the second bracket attachment 506 toward the inner end 508a of the I-beam 508. An outer edge of the base brace 516 is fixed to the inner surface of the second bracket attachment 506 by suitable means such as welding.

An outer bearing bracket 518 is mounted on the outer end 508b of the I-beam 508. The outer bearing bracket 518 includes a base portion 520, an upper portion 522 and a lower portion 524. The base portion 520 of the outer bearing bracket 518 is perpendicular to the I-beam 508 and parallel to the first and second bracket attachments 504, 506. The upper and lower portions 522, 524 of the outer bearing bracket 518 are angled relative to the base portion 520 and are provided at an angle of approximately ninety degrees relative to the base portion 520. The upper portion 522 is positioned over the upper horizontal member 510 of the I-beam 508 and the lower portion 524 is positioned below the lower horizontal member 512 of the I-beam 508. The outer bearing bracket supports a front outer bearing 534 through bolts 535 mounted within apertures through the outer bearing bracket 518. The outer bearing bracket 518 also supports a rear outer bearing 538 (see FIG. 17) through bolts 537 mounted within apertures provided through the outer bearing bracket 518.

An inner bearing bracket 526 is mounted on the inner end 508a of the I-beam 508. The inner bearing bracket 526 includes a base portion 528, an upper portion 530 and a lower portion 532. The inner bearing bracket 532 is identical to the outer bearing bracket 520. The inner bearing bracket 532 supports a front inner bearing 536 through bolts 533 mounted within apertures through the inner bearing bracket 532. The inner bearing bracket 532 also supports a rear inner bearing (not shown) through bolts 531 mounted within apertures provided through the inner bearing bracket 532.

Each bearing 534, 536, 538 and the rear inner bearing is identically formed and includes a first portion and a second portion. The front outer bearing 534 includes a first portion 534a and a second portion 534b. The first portion 534a of the front outer bearing 534 is mounted to the outer bearing plate 518 proximate the front end thereof. The second portion 534b of the front outer bearing 534 is mounted within the first portion 534a in a known manner such that the second portion 534b rotates relative to the first portion 534a. The front inner bearing 536 includes a first portion and a second portion. The first portion 536a front inner bearing 536 is mounted to the inner bearing plate 526 proximate the front end thereof. The second portion 536b of the front inner bearing 536 is mounted within the first portion 536a in a known manner such that the second portion 536b rotates relative to the first portion 536a. The rear outer bearing 538 includes a first portion 538a and a second portion 538b. The first portion 538a of the rear outer bearing 538 is mounted to the outer bearing plate 518 proximate the rear end thereof. The second portion 538b of the rear outer bearing 538 is mounted within the first portion 538a in a known manner such that the second portion 538b rotates relative to the first portion 538a. The rear inner bearing includes a first portion and a second portion. The first portion of the rear inner bearing is mounted to the inner bearing plate 526 proximate the inner end thereof. The second portion of the front inner bearing is mounted within the first portion in a known manner such that the second portion rotates relative to the first portion.

An elongated front cross shaft 540 extends between the front outer bearing 534 and the front inner bearing 536. An elongated rear cross shaft 542 extends between the rear outer bearing 538 and the rear inner bearing.

A front link arm 544 is mounted to the front cross shaft 540. The front link arm 544 includes an inner plate 546 and an outer plate 548 which are spaced apart from one another. The inner and outer plates 546, 548 are generally triangularly shaped and each plate includes a shaft opening and a link eye opening. The front cross shaft 540 passes through the shaft openings and is fixed to the plates 546, 548 by suitable means such as, for example, welding. A stiffening spacer 550 extends from the inner plate 546 to the outer plate 548 and is fixed to the inner and outer plates 546, 548 by suitable means such as, for example, welding. A shaft 552 which may be formed from a steel pipe having a brass bushing therein is mounted within the link eye openings. A portion of the shaft 552 extends beyond the inner surface of the inner plate 548 and a portion of the shaft 552 extends beyond the outer surface of the outer plate 546.

A spring shackle (not shown) identical to the spring shackle of the first embodiment is mounted to the shaft 552. As described with respect to the first embodiment, the spring shackle includes identical inner and outer shackle plates 141. The shackle plates 141, as shown in FIG. 7, includes a first end 144 and a second end 146. A first shackle aperture 147 is provided at the first end 144 of each shackle plate 141 and a second shackle aperture 149 is provided at the second end of each shackle plate 141. A shoulder bolt and locking nut are provided for mounting the shackle plates 141 fo the shaft 552 of the link arm 544.

A rear link arm 554 is mounted to the rear cross shaft 542. The rear link arm 554 includes an inner plate 556 and an outer plate 558 which are spaced apart from one another. The inner and outer plates 556, 558 are generally triangularly shaped and each plate includes a shaft opening and a link eye opening. The rear cross shaft 542 passes through the shaft openings and is fixed to the plates by suitable means such as, for example, welding. A stiffening spacer 560 extends from the inner plate 556 to the outer plate 558 and is fixed to the inner and outer plates 556, 558 by suitable means such as, for example, welding. A shaft 562 which may be formed form a steel pipe having a brass bushing therein is mounted within the link eye openings. A portion of the shaft 562 extends beyond the inner surface of the inner plate 556 and a portion of the shaft 562 extends beyond the outer surface of the outer plate 558. A spring shackle identical to the spring shackle of the first embodiment is mounted to the shaft 562. A shoulder bolt and locking nut are provided for mounting the shackle plates to the shaft 562 of the rear link arm 554.

A front transitional arm 564 is provided on the front cross shaft 540. The front transitional arm 564 includes a base portion 566 and first, second, and third extensions 568, 570, 572 extending from the base portion 566. The first extension 568 extends rearwardly from the base portion 566 and is positioned below the upper horizontal portion 510 of the I-beam 508. The first extension 568 includes an aperture through which the front cross shaft 540 is positioned and the cross shaft 540 is fixed to the transitional arm 564, preferably by welding. The second and third extensions 570, 572 also extend rearwardly and are positioned above the upper horizontal portion of the I-beam.

A rear transitional arm 574 is provided on the rear cross shaft 542. The rear transitional arm 574 includes a base portion 576 and first, second, and third extensions 578, 580, 582 extending from the base portion. The first extension 578 extends forwardly from the base portion 576 and is positioned below the upper horizontal portion 510 of the I-beam 508. The first extension 578 includes an aperture through which the rear cross shaft 542 is positioned and the rear cross shaft 542 is fixed to the rear transitional arm 574, preferably by welding. The second and third extensions 580, 582 also extend forwardly and are positioned above the upper horizontal portion 510 of the I-beam 508.

A generally cylindrically-shaped air bag 584 is positioned between the second and third extensions 570, 572 of the front transitional arm 564 and the second and third extensions 580, 582 of the rear transitional arm 574. Although the isolator 500 is described using an air bag 584, as discussed with respect to the isolator 20 and the isolator 300, alternatively a steel spring, a coil spring, a rubber spring or other composite material could be used for dampening. A front air bag attachment bracket 586 is provided on the front end of the air bag 584 and a rear air bag attachment bracket 588 is provided on the rear end of the air bag 584. An aperture 590 is provided through the front air bag attachment bracket 586 for connecting an air hose thereto in order to supply air to the air bag 584 as will be described herein. The front air bag attachment bracket 586 is mounted to the second and third extensions 570, 572 of the front transitional arm 564 by appropriate means, such as, welding. The rear air bag attachment bracket 588 is mounted to the second and third extensions 580, 582 of the rear transitional arm 574 by appropriate means such as, welding. Although, the isolator 500 has been described as including an aperture 590 through the front air bar attachment bracket 586 for connecting an air hose to the air bag 584, an aperture could be provided through the rear air bag attachment bracket 588 for connecting an air hose to the air bag 584.

Generally triangularly shaped support ribs 592 extend from the outer surfaces of the second and third extensions 570, 572 of the front transitional arm 564 and are mounted to the front air bag attachment bracket 586. The support ribs 592 are perpendicular to the front air bag attachment bracket 586 and are spaced apart from one another. Generally triangularly shaped support ribs 594 extend from the inner surfaces of the second and third extensions 570, 572 of the front transitional arm 564 and are mounted to the front air bag attachment bracket 586. The support ribs 594 are perpendicular to the front air bag attachment bracket 586 and are spaced apart from one another.

Generally triangularly shaped support ribs 598 extend from the outer surfaces of the second and third extensions 580, 582 of the rear transitional arm 574 and are mounted to the rear air bag attachment bracket 588. The support ribs 598 are perpendicular to the rear air bag attachment bracket 588 and are spaced apart from one another. Generally triangularly shaped support ribs 600 extend from the inner surfaces of the second and third portions 580, 582 of the rear transitional arm 574 and are mounted to the rear air bag attachment bracket 588. The support ribs 600 are perpendicular to the rear air bag attachment bracket 588 and are spaced apart from one another.

Although not shown, safety stops can be provided on the front and rear air bag attachment brackets 586, 588, similar to the safety stops shown in connection with the second embodiment of the invention.

Front and rear leaf springs (not shown) are mounted to the equalizer in a manner identical to that described with respect to the first and second embodiments. The front leaf spring is mounted between the second end of the front spring shackle and the frame of the vehicle and the rear leaf spring is mounted between the second of the rear spring shackle and the frame of the vehicle.

As the front leaf spring moves upward or downward, the front spring shackle will move upward or downward. Because the front spring shackle is mounted on the front spring arm 544, the front spring arm 544 will rotate clockwise or counter-clockwise causing the front cross shaft 540 to rotate clockwise or counter-clockwise. From the perspective shown in FIG. 18, as the front cross shaft 540 rotates counter-clockwise, the front transitional arm 564 will rotate counter-clockwise about the front cross shaft 540 causing the air bag 584 to deflect to the right. Thus, the air bag 584 will contract.

As the rear leaf spring moves upward or downward, the rear spring shackle will move upward or downward. Because the rear spring shackle is mounted on the rear spring arm 554, the rear spring arm 554 will rotate clockwise or counter-clockwise causing the rear cross shaft 542 to rotate clockwise or counter-clockwise. From the perspective shown in FIG. 18, as the rear cross shaft 542 rotates counter clockwise, the rear transitional arm 574 will rotate counter-clockwise about the rear cross shaft 542 causing the air bag 584 to deflect to the left. Thus, the air bag 584 will contract.

Although the air springs of the isolators 20, 300, 500 are shown mounted above the front and rear shafts, it is to be understood that the air spring could also be mounted below the front and rear shafts. If the air spring were to be mounted below the front and rear shafts, the transitional arms attached to the ends of the air spring would be criss-crossed to provide the proper translation of the forces experienced by the front and rear leaf springs.

Suspension systems which include the isolators 20, 300, 500 provide several advantages over prior art suspension systems. Mechanical advantages are provided by the isolators 20, 300, 500 because of the distance between the spring arms and the rotational shaft and the distance between the rotational shaft to the air spring attachment brackets. In the preferred embodiment for example, a mechanical advantage of three to one is provided. This mechanical advantage can be increase or decreased depending on the mechanical advantage desired, by lengthening or shortening certain components. For example, the mechanical advantage can be modified by lengthening or shortening the length of the spring arms or by lengthening or shortening the arms of the slack adjusters. The increase or decrease of the mechanical advantage may be desired, for example, when the isolator is adapted for a vehicle of a different weight classification. In the preferred embodiment, a travel ratio of six to one is provided. The travel ratio of six to one is achieved by the distance between the end of the axle to the second end of the shackle. For example, in the isolator 20, the travel ratio of six to one is provided by the distance between the end of the axle 158 to the second end 146 of the spring shackle 141. As a result, if the wheel end travels up to six inches, the trailer deck will travel an inch or less. Thus, roll stability issues are greatly reduced. The mechanical advantages provided by the isolators also allows a smaller air spring to be used than that required in the prior art suspension systems. Use of a smaller air spring results in cost savings.

In addition to the ability to use a smaller air spring, only two air springs are required in a tandem axle system. Unlike prior art isolated tandem axle suspension systems which require four vertically mounted air springs, the isolators 20, 300, 500 utilize two air springs which are mounted horizontally. Although two axles are connected to each horizontally mounted air spring, the isolators 20, 300, 500 operate to isolate forces experienced by one axle from the remaining axle. Likewise, in a tri-axle system, isolator 20, 300, 500 utilize three air springs rather than six.

In addition to reducing the number of air springs required, by mounting the air springs in the unique horizontal position the vehicle's ride quality is improved. The air spring dampens the forces transferred thereto without transmitting residual frequencies to the frame of the vehicle because the air spring is not directly attached to the frame of the vehicle.

The horizontal mounting of the air spring also eliminates pulling apart or over extension of the air spring. Often trailers are shipped via train rail. In these situations, the trailers must be lifted off of their wheels in order to load the trailers for transportation. In suspension systems including vertically mounted air springs, when the trailer is lifted, the weight of the axles and wheels pulls the air spring downward, causing the air spring to expand beyond its normal point of expansion. Once the trailer is placed back on its wheels, the air spring cannot properly reposition itself and is now susceptible to improper performance and/or damage. Because the air springs of the isolators 20, 300, 500 are mounted horizontally, the air spring will contract as the trailer is lifted. Thus, over extension of the air spring is avoided. In addition, the safety stops, or alternatively an internal bumper is provided to prevent collapse of the air spring.

The isolators 20, 300, 500 also eliminate the problem of dock walk. Dock walk is experienced when a fork lift enters and exits a trailer. Each trip in an out of the trailer cause the trailer suspension system to flex. In a trailing beam suspension system, for example, the trailing beams actuate through the arc of travel causing the trailer to gradually walk away from the dock. As a fork lift enters the trailer to which the isolator 20, 300 or 500 is mounted, the rear axle is pushed downward causing the rear leaf springs to move downward. As the rear leaf springs move downward the rear cross shafts will rotate and cause the slack adjusters or transitional arms to rotate so as to pull the rear side of the air spring in the rearward direction. Due to the properties of the air spring, pulling of the rear side of the air bag in the rearward direction does not result in movement of the front side of the air bag. Therefore, the air spring isolates the forces experienced by the rear axle and these forces are not translated to the front axle. As a result, the trailer deck simple moves up and down as the fork lift enters and exits the trailer but does not move forward and rearward. Thus, dock walk is eliminated.

Because the isolators 20, 300, 500 utilize components which are standard to the industry, such as, for example, center hangers, spring chairs and U-bolts, these items are readily available and can be acquired fairly inexpensively.

Attention is invited to FIGS. 19–20. As described above the isolators 20, 300, 500 can be used in connection with a variety of vehicles including vehicles with tandem or multi-axle suspension systems. The isolators can also be used in connection with vehicles having tandem drive axles, the drive components of the tandem drive system are not shown in FIGS. 19 and 20. When used in connection with tandem drive axles, a torque arm 600 is included to control the axle. Each spring hanger 602 includes a torque arm receiver 604. The torque arm 600 extends from the spring chair 606 to the torque arm receiver 604. The torque arm 600 prevents the axle from getting to close to the spring hangers 602 associated with the axle.

Although preferred embodiments of the present invention are shown and described, it is envisioned that those skilled in the art may devise various modifications of the present invention without departing for the spirit and scope of the appended claims.

The invention claimed is:

1. An isolator to be used in a suspension system for a vehicle having generally parallel first and second axles, the isolator comprising:
   a front shaft generally parallel to said first and second axles;
   a rear shaft generally parallel to said first and second axles;
   a body attached to the vehicle and supporting said front shaft and said rear shaft, said front shaft and rear shaft being rotatable relative to said body, wherein said body maintains a pre-determined distance between the vehicle and said front and rear shafts;
   a front transitional arm attached to said front shaft;
   a rear transitional arm attached to said rear shaft;
   a resilient member attached to said front transitional arm and attached to said rear transitional arm;
   a front link arm attached to said front shaft;
   a rear link arm attached to said rear shaft;
   wherein when force is applied to said front link arm, said front shaft and said front transitional arm rotate and said resilient member is compressed or expanded; and
   wherein when force is applied to said rear link arm, said rear shaft and said rear transitional arm rotate and said resilient member is compressed or expanded.

2. An isolator as defined in claim 1, wherein
   said front transitional arm is a slack adjuster and said rear transitional arm is a slack adjuster;
   said front transitional arm being capable of rotation relative to said front shaft; and
   said rear transitional arm being capable of rotation relative to said rear shaft.

3. An isolator as defined in claim 2, further including:
   a shaft aperture within said front transitional arm having a spline therein;
   a shaft aperture within said rear transitional arm having a spline therein;
   a spline on at least a portion of said front shaft;
   a spline on at least a portion of said rear shaft;
   wherein said portion of said front shaft is positioned within said shaft aperture in said front transitional arm and said spline on said front shaft mates with said spline of said front transitional arm; and
   wherein said portion of said rear shaft is positioned within said shaft aperture in said rear transitional arm and said spline on said rear shaft mates with said spline of said rear transitional arm.

4. An isolator as defined in claim 2, further including:
   a front transitional arm adjustment associated with said front transitional arm for rotating said front transitional arm relative to said front shaft; and
   a rear transitional arm adjustment associated with said rear transitional arm for rotating said rear transitional arm relative to said rear shaft.

5. An isolator as defined in claim 1, wherein said resilient member is an air bag.

6. An isolator as defined in claim 5, wherein said front transitional arm further includes a front air bag attachment bracket and said rear transitional arm further includes a rear air bag attachment bracket and wherein an air bag aperture is provided through one of said air bag attachment brackets.

7. An isolator as defined in claim 6, further including an air hose connected to said air bag aperture.

8. An isolator as defined in claim 5, wherein said front transitional arm further includes at least one rearward extending safety stop and wherein said rear transitional arm further includes at least one forward extending safety stop.

9. An isolator as defined in claim 1, wherein said
front transitional arm is fixedly attached to said front shaft and wherein said
rear transitional arm is fixedly attached to said rear shaft.

10. An isolator as defined in claim 1, further including:
a front shackle mounted to said front link arm, and
a rear shackle mounted to said rear link arm.

11. An isolator as defined in claim 10, wherein said front shackle and said rear shackle can be exchanged for an alternative front shackle and rear shackle.

12. An isolator as defined in claim 1, wherein said attaching means includes:
a bearing mounted proximate each end of said front shaft; and
a bearing mounted proximate each end of said rear shaft.

13. An isolator as defined in claim 12, wherein said bearings are tapered.

14. An isolator as defined in claim 1 wherein said body is sliding engaged with said vehicle to provide adjustment of said pre-determined distance between the vehicle and the front and rear shafts.

15. An isolator to be used in a suspension system for a vehicle, the isolator comprising:
a front shaft;
a rear shaft;
an inner bearing plate mounted proximate inner ends of said front and rear shafts and an outer bearing plate mounted proximate outer ends of said front and rear shafts for attaching said front shaft and said rear shaft to the vehicle, said front shaft and rear shaft being rotatable relative to said inner and outer bearing plates;
a front transitional arm attached to said front shaft;
a rear transitional arm attached to said rear shaft;
a resilient member attached to said front transitional arm and attached to said rear transitional arm;
a front link arm attached to said front shaft;
a rear link arm attached to said rear shaft;
wherein when force is applied to said front link arm, said front shaft and said front transitional arm rotate and said resilient member is compressed or expanded; and
wherein when force is applied to said rear link arm, said rear shaft and said rear transitional arm rotate and said resilient member is compressed or expanded.

16. A suspension system for a vehicle having a frame a front axle and a rear axle, the suspension system comprising:
a front leaf spring having a first end and a second end, said first end being attached to the frame of the vehicle and supporting a front axle;
a rear leaf spring having a first end and a second end, said first end being attached to the frame of the vehicle and supporting a rear axle;
an isolator including:
a front shaft;
a rear shaft;
means for attaching said front shaft and said rear shaft to the vehicle, said front shaft and rear shaft being rotatable relative to said attaching means;
a front transitional arm attached to said front shaft;
a rear transitional arm attached to said rear shaft;
a resilient member attached said front transitional arm and attached to said rear transitional arm;
a front link arm attached to said front shaft;
a rear link arm attached to said rear shaft;
a front shackle attached to said front link arm and to said front leaf spring;
a rear shackle attached to said rear link arm and to said rear leaf spring;
wherein when force is applied to said front leaf spring, said front link arm, said front shaft, and said front transitional arm rotate and said resilient member is compressed or expanded; and
wherein when force is applied to said rear leaf spring, said rear leaf spring, said rear shaft, and said rear transitional arm rotate and said resilient member is compressed or expanded.

17. A suspension system as defined in claim 16, wherein
said front transitional arm is a slack adjuster and said rear transitional arm is a slack adjuster;
said front transitional arm being capable of rotation relative to said front shaft; and
said rear transitional arm being capable of rotation relative to said rear shaft.

18. A suspension system as defined in claim 17, further including:
a shaft aperture within said front transitional arm having a spline therein;
a shaft aperture within said rear transitional arm having a spline therein;
a spline on at least a portion of said front shaft;
a spline on at least a portion of said rear shaft;
wherein said portion of said front shaft is positioned within said shaft aperture in said front transitional arm and said spline on said front shaft mates with said spline of said front transitional arm; and
wherein said portion of said rear shaft is positioned within said shaft aperture in said rear transitional arm and said spline on said rear shaft mates with said spline of said rear transitional arm.

19. A suspension system as defined in claim 16, further including:
a front transitional arm adjustment associated with said front transitional arm for rotating said front transitional arm relative to said front shaft;
a rear transitional arm adjustment associated with said rear transitional arm for rotating said rear transitional arm relative to said rear shaft; and
wherein upon rotation of said front transitional arm relative to said front shaft, said front leaf spring moves upward or downward and upon rotation of said rear transitional arm relative to said rear shaft, said rear leaf spring moves upward or downward.

20. A suspension system as defined in claim 16, wherein said front transitional arm is fixedly attached to said front shaft and wherein said rear transitional arm is fixedly attached to said rear shaft.

21. A suspension system as defined in claim 16, wherein said resilient member is an air bag.

22. A suspension system as defined in claim 21, further including a fill valve in fluid communication with said air bag.

23. A suspension system as defined in claim 21, further including an air pressure gauge in fluid communication with said air spring.

24. A method for adjusting the ride height of a vehicle having a frame comprising the steps of:
providing a suspension system including:
a front leaf spring having a first end and a second end, said first end being attached to the frame of the vehicle;
a rear leaf spring having a first end and a second end, said first end being attached to the frame of the vehicle;
an isolator including:
a front shaft,
a rear shaft,
a front transitional arm attached to said front shaft,
a rear transitional arm attached to said rear shaft,
a resilient member attached to said front transitional arm and attached to said rear transitional arm,
a front link arm attached to said front shaft,
a rear link arm attached to said rear shaft,
a front shackle attached to said front link arm and to said second end of said front leaf spring;
a rear shackle attached to said rear link arm and to said second end of said rear leaf spring;
lengthening or shortening the front spring shackle and the rear spring shackle to achieve the desired ride height.

25. A method for adjusting the ride height of a vehicle having a frame comprising the steps of:
providing a suspension system including:
a front leaf spring having a first end and a second end, said first end being attached to the frame of the vehicle;
a rear leaf spring having a first end and a second end, said first end being attached to the frame of the vehicle;
an isolator including:
a front shaft,
a rear shaft,
a front transitional arm attached to said front shaft,
a rear transitional arm attached to said rear shaft,
a resilient member attached to said front transitional arm and attached to said rear transitional arm,
a front link arm attached to said front shaft,
a rear link arm attached to said rear shaft,
a front shackle attached to said front link arm and to said second end of said front leaf spring;
a rear shackle attached to said rear link arm and to said second end of said rear leaf spring;
rotating said front transitional arm relative to said front shaft to raise or lower said front leaf spring; and
rotating said rear transitional arm relative to said rear shaft to raise or lower said rear leaf spring.

26. An isolator to be used in a suspension system for a vehicle having a first axle supported by a first spring and a second axle supported by a second spring, the isolator comprising:
a resilient member;
a first shaft operatively connected to said first spring and said resilient member, wherein said first shaft rotates in response to forces applied to or removed from said first spring;
a second shaft operatively connected to said second spring and said resilient member, wherein said second shaft rotates in response to forces applied to or removed from said second spring; and
wherein rotation of said first and second shaft transfers said forces to said resilient member and causes said resilient member to expand or contact.

* * * * *